Nov. 12, 1957 B. OSTENDORF, JR., ET AL 2,813,151

IMPULSE SIGNAL DISTORTION CIRCUIT

Filed Oct. 6, 1953 6 Sheets-Sheet 1

INVENTORS B. OSTENDORF, JR.
W. T. REA

BY John E. Cassidy

ATTORNEY

Nov. 12, 1957 B. OSTENDORF, JR., ET AL 2,813,151

IMPULSE SIGNAL DISTORTION CIRCUIT

Filed Oct. 6, 1953 6 Sheets-Sheet 2

INVENTORS B. OSTENDORF, JR.
W. T. REA

BY John E. Cassidy
ATTORNEY

INVENTORS B. OSTENDORF, JR.
W. T. REA
BY
John E. Cassidy
ATTORNEY

IMPULSE SIGNAL DISTORTION CIRCUIT

Filed Oct. 6, 1953

6 Sheets-Sheet 4

INVENTORS B. OSTENDORF, JR.
W. T. REA

BY John E. Cassidy
ATTORNEY

IMPULSE SIGNAL DISTORTION CIRCUIT

INVENTORS B. OSTENDORF, JR.
W. T. REA
BY
John E. Cassidy
ATTORNEY

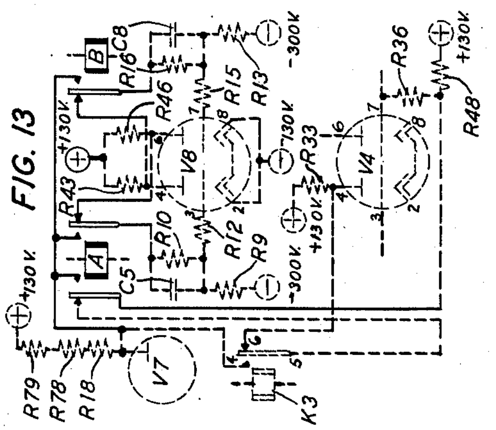
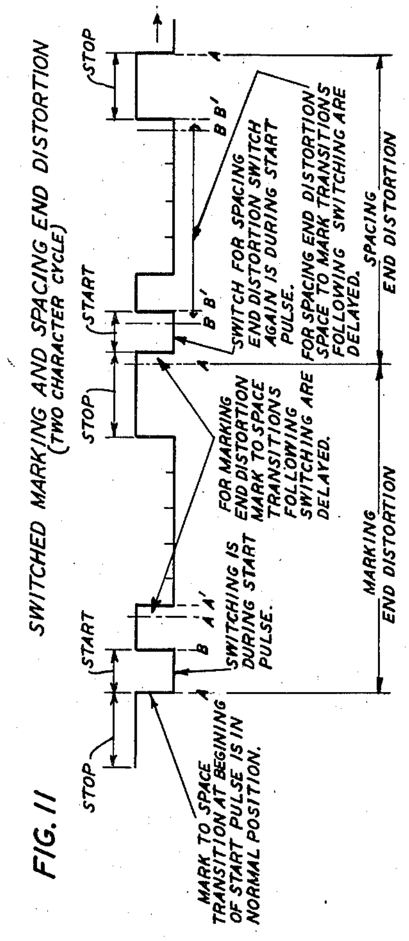
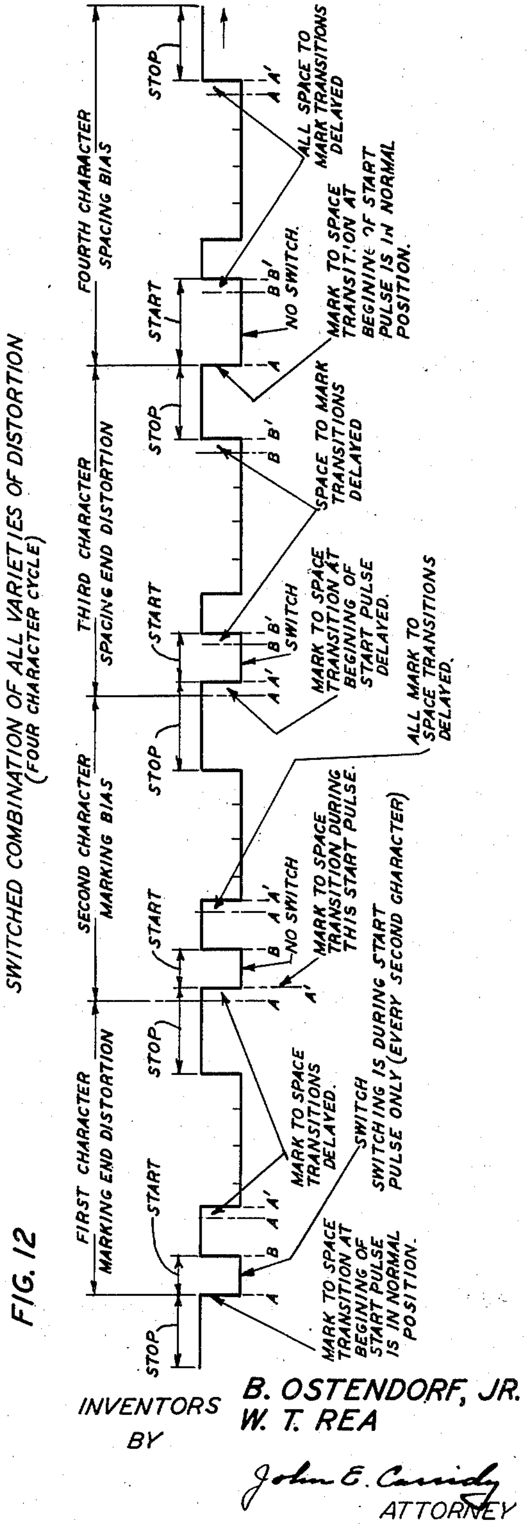
FIG. 13
FIG. 11
FIG. 12
INVENTORS B. OSTENDORF, JR.
W. T. REA
BY
John E. Cassidy
ATTORNEY

United States Patent Office 2,813,151

Patented Nov. 12, 1957

2,813,151

IMPULSE SIGNAL DISTORTION CIRCUIT

Bernard Ostendorf, Jr., Stamford, Conn., and Wilton T. Rea, Manhasset, N. Y., assignors to Bell Telephone Laboratories, Incorporated, New York, N. Y., a corporation of New York Application October 6, 1953, Serial No. 384,482

22 Claims. (Cl. 178—69)

This invention relates to the production of trains of telegraph signals in which the signal elements, of which the trains are comprised, have certain predetermined amounts and kinds of distortion.

An object of the invention is the production of trains of signal elements having predetermined amounts and kinds of distortion.

In testing certain telegraph devices, such as teletypewriter receivers, it is desirable to be able to determine their capabilities and limitations by subjecting them to trains of abnormal signals, such as are encountered in operation due to various causes. In order to do this it is necessary to produce trains of signals having different kinds and amounts of distortion at the different signal train transmission speeds employed in practice. The circuit of the present invention performs these functions.

The invention, in the present embodiment, is incorporated in producing distortion in telegraph signal trains known as start-stop telegraph signals.

The present circuit is capable of producing five different types of distorted signal train patterns. The first pattern is a succession of signal trains all of which have marking bias. By this is meant that every mark-to-space signal transition in the train, including the stop-to-start transition, which is always a mark-to-space transition, is delayed. The second pattern is a succession of signal trains in each of which each space-to-mark signal transition is delayed. This is known as spacing bias. A third signal pattern is called herein switched bias. In switched bias a signal train having marking signal bias and a signal train having spacing signal bias are alternated. A fourth signal pattern, which may be produced by the present circuit, is known as switched marking and spacing end distortion. In this pattern what will be called a cycle comprises two signal trains, the first of which has what will be called herein marking end distortion and the second of which has what will be called herein spacing end distortion. In the first train of signals of the two trains comprising this cycle, that is the train having marking end distortion, the first mark-to-space transition at the beginning of the start pulse is in the normal position. Each subsequent mark-to-space transition among the character forming elements will be delayed. In the second train of signals comprising this cycle the mark-to-space transition of the start pulse is delayed and all space-to-mark transitions in the character forming elements are delayed. Then the cycle is repeated. The fifth pattern of signals, which may be produced by the present circuit, will be called herein a switched combination of all varieties of distortion. This train comprises four characters to a cycle; the first character has marking end distortion, the second character has marking bias, the third character has spacing end distortion and the fourth character has spacing bias.

The present embodiment of the circuit of the invention is arranged so that the amount of distortion introduced into the signals may be established at certain fixed predeterminable discrete amounts such as 25 percent, 30 percent or 35 percent or it may be variable over a range.

The present embodiment of the circuit of the invention is arranged also to operate, for instance, at 60, 75 and 100 words per minute, for five unit code character forming signals, or at 53, 66 and 86 words per minute for six unit code character forming signals.

The invention may be understood from the following description when read with reference to the associated drawings which taken together disclose a preferred embodiment in which the invention is presently incorporated. It is to be understood, however, that the invention may take other forms and is not limited to the described embodiment. It is to be understood also, that, in the description hereinafter, the values of constants cited are to be taken by way of example, and not to be considered as limitations.

Refer now to the drawings. In the drawings:

Fig. 1, Fig. 2 and Fig. 3 disposed as indicated in Fig. 4 show the telegraph signal distorting circuit of the present invention in detail;

Fig. 11 shows one cycle of switched marking and spacing end distortion signals comprising two signal trains, one having marking end distortion and the other having spacing end distortion;

Figure 1:
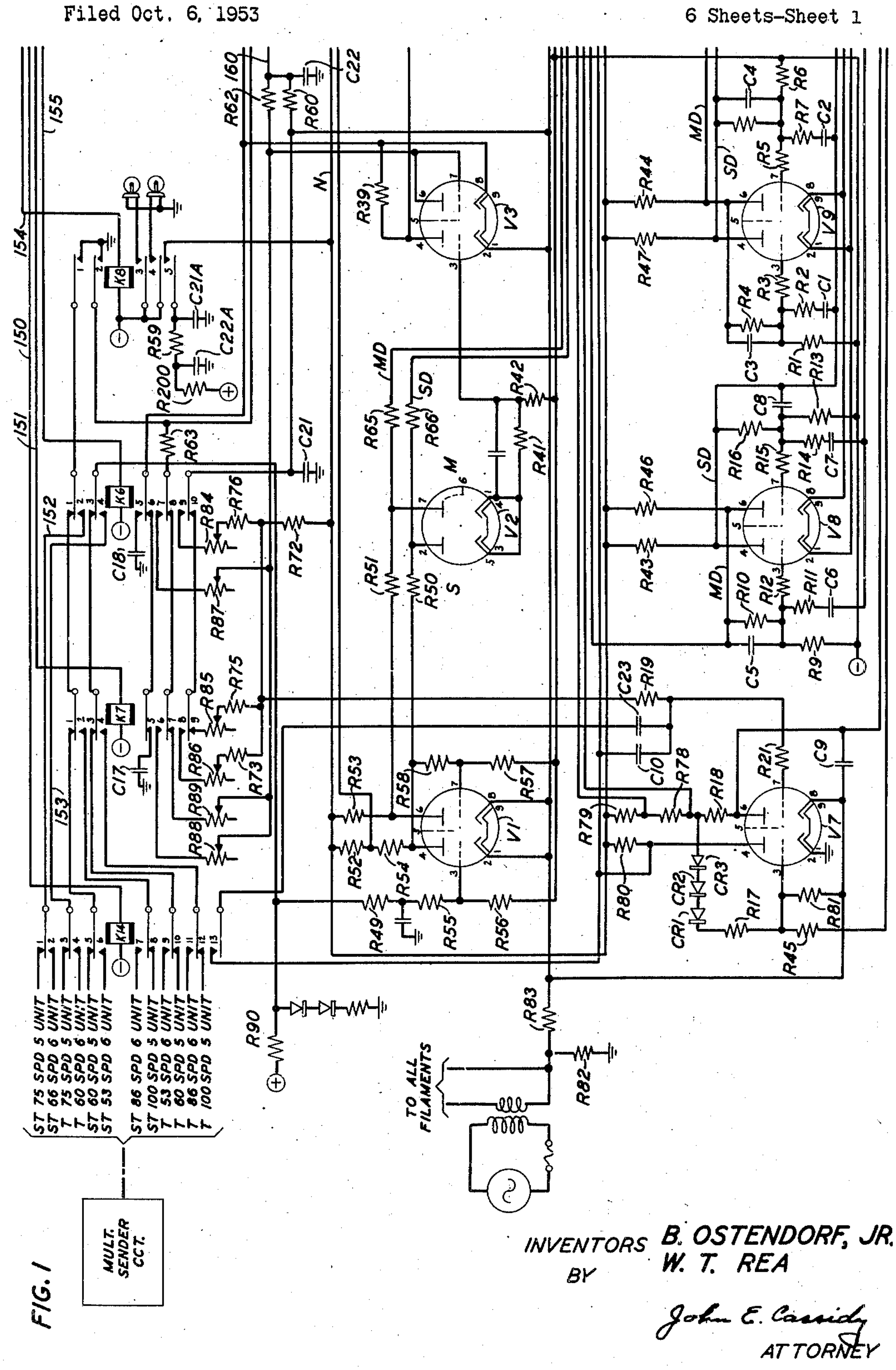
Figure 2:
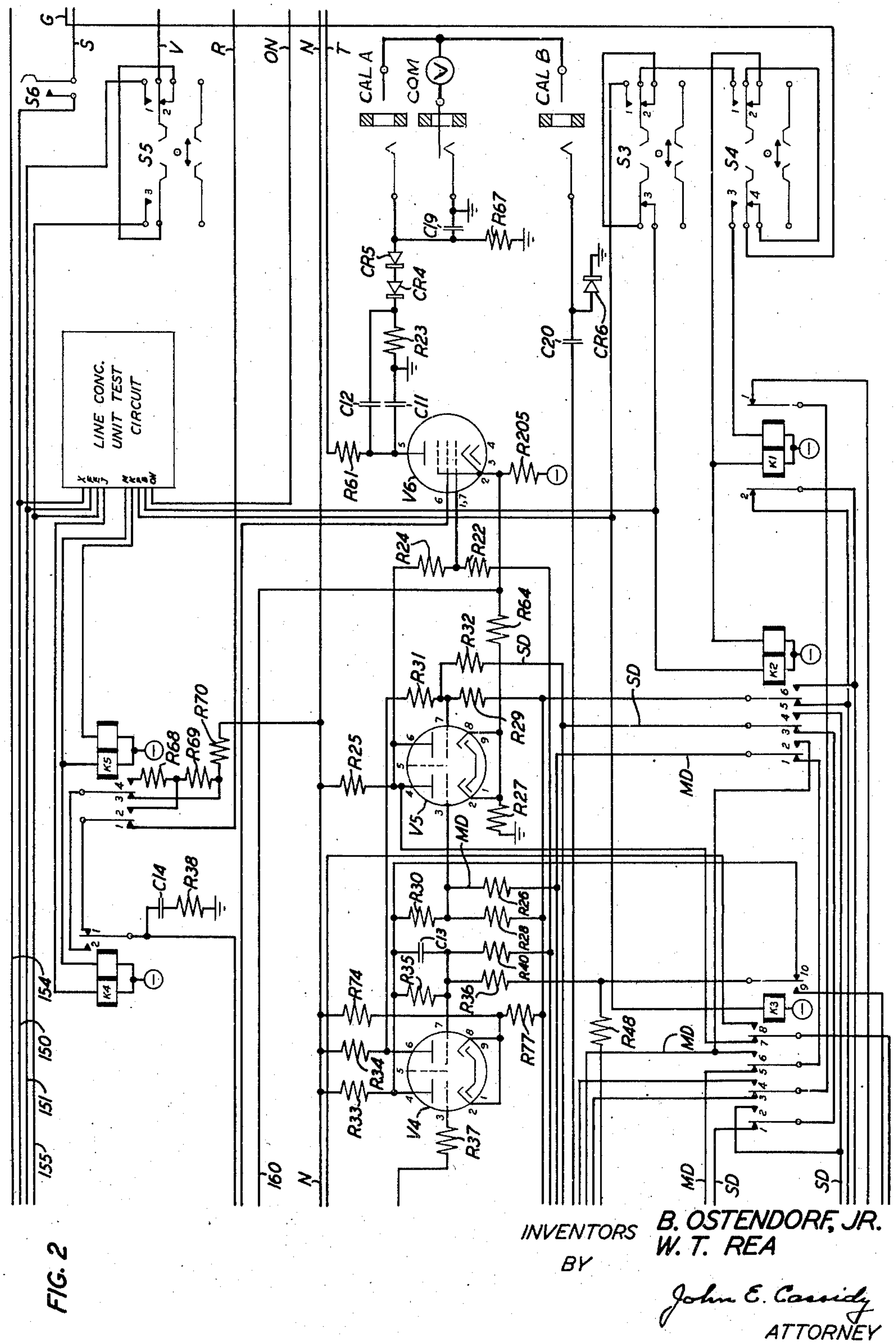
Figures 3, 4:
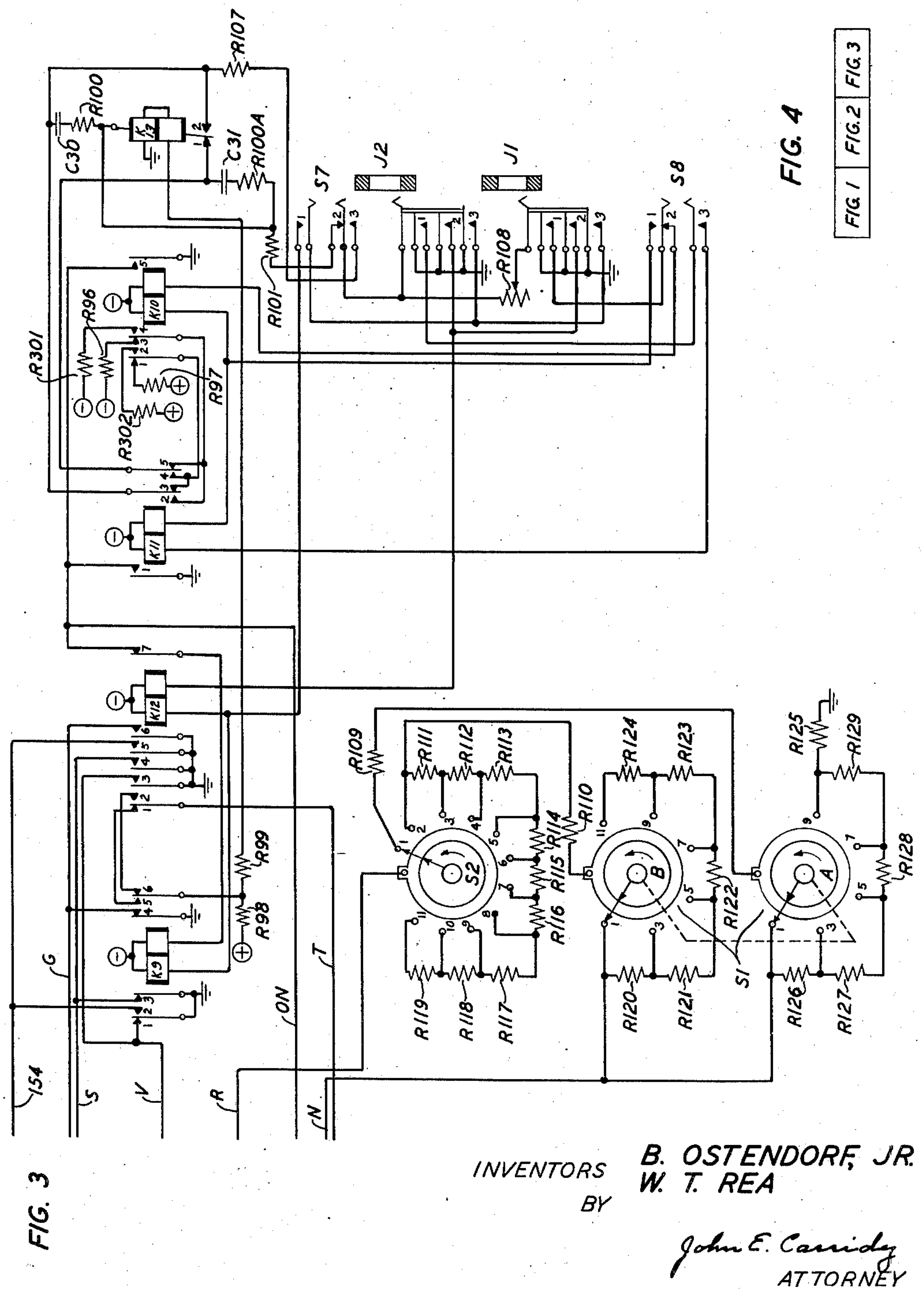

Fig. 12 shows a cycle of four signal trains which is a switched combination of all varieties of distortion, the first train has marking end distortion, the second train has marking bias, the third train has spacing end distortion and the fourth train has spacing bias; and Fig. 13 shows a minor modification of Figs. 1, 2 and 3 to provide two additional kinds of distorted signal trains, the first a succession of trains all having marking end distortion and the second a succession of trains all having spacing end distortion.

DESCRIPTION OF KINDS OF DISTORTED SIGNAL TRAINS PRODUCED

Figures 7, 8, 9, 10:
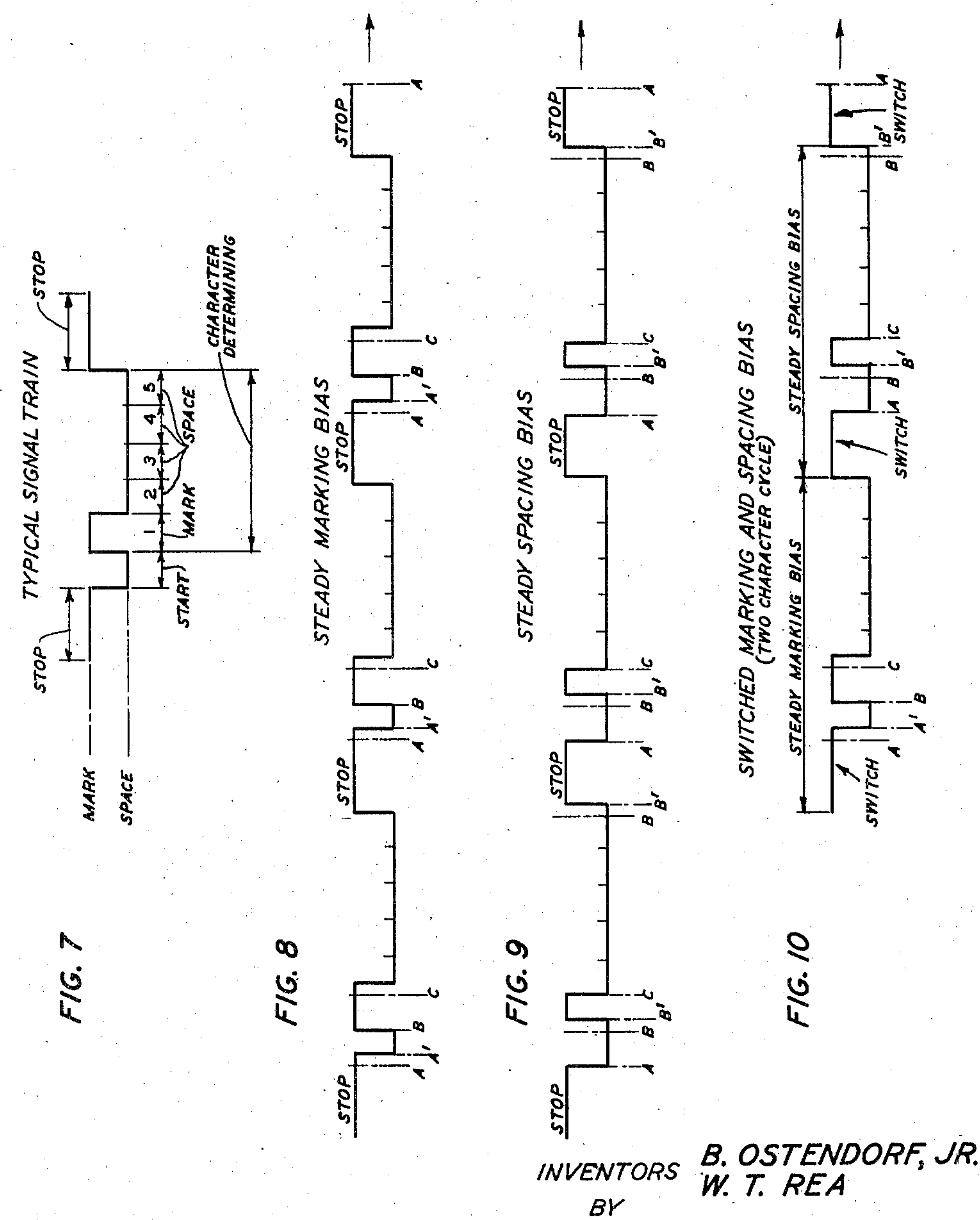
Fig. 7 shows a typical signal train.
Fig. 8 shows a succession of signal trains each having a steady marking bias.
Fig. 9 shows a succession of signal trains each having a steady spacing bias.
Fig. 10 shows one cycle of switched bias signals comprising two signal trains, the first having steady marking bias and the second having steady spacing bias.

First it appears desirable to describe one typical form of signal train, such as may be impressed on the present circuit for modification as desired. Such a train is shown in Fig. 7. It is known as a start-stop five-element train. The entire signal train consists of seven signal elements, consisting of a start element, five character determining elements and a stop element. The first signal element shown at the left in the signal train per Fig. 7 is the stop signal element which is a marking signal element. This represents the condition prevailing while the system is idle as well as the condition obtaining between the transmission of signal trains, when signal trains are sent successively, as they normally are. The signal element following the stop signal element is the start signal element, which is a spacing signal element. The succeeding five signal elements are used in determining the particular letter or number character, or teletypewriter stunt function, such as line feed, carriage return, etc., defined by the train. These five character or teletypewriter stunt function determining elements may be marking or spacing in any combination. In the train shown as typical in Fig. 7, there are five character determining elements. It is to be understood that the arrangement herein will function in producing distortion in a signal train having a different number of character determining elements, such as six elements for instance. Of the five character determining elements shown in the typical signal train Fig. 7, the first is a marking signal element, the second, third, fourth and fifth are all spacing signal elements. The signal element shown to the right of the character determining elements is the next stop signal element, which is, as always, a marking signal element. In the arrangement shown in Fig. 7, the signal lengths have been selected arbitrarily for purposes of illustration. The stop element as indicated is longer in duration than the other signal elements.

Refer now to Fig. 8. Fig. 8 shows a succession of signal trains, each signal train having marking signal bias. The marking signal bias performs a delay in all marking-to-spacing signal transitions and lengthens each marking signal element. In Fig. 8 the dotted lines marked A show the normal position for the beginning of a start signal. The preceding stop signal has been lengthened, however, by the interval between the vertical line A and the vertical line A′ in each instance. The vertical line C in each marking signal element, there being one in each signal train, is the normal position for the termination of the marking signal element. The marking signal element has been protracted in each instance, as is evidenced by a delay in transition, from the marking to the spacing signal level.

Refer now to Fig. 9. Fig 9 shows a succession of signal trains to each of which spacing bias has been applied. As a result of this, each spacing signal element has been lengthened. The first spacing signal element is the start signal element and its normal termination is at the vertical line B. The start spacing signal element has been lengthened so that the transition does not occur in each train until the point indicated by the vertical line B′. The marking signal element succeeding the start signal element has been shortened an amount equal to the lengthening of the preceding start signal. The only other transition from space to marking in each of the trains shown in Fig. 9 is the transition from the last spacing signal element to the stop signal element which is marking. This transition too as is apparent in Fig. 9, has been delayed.

Refer now to Fig. 10. Fig. 10 shows trains of signals in which a train having steady marking bias is succeded by a train having steady spacing bias. Each cycle of the signals per Fig. 10, therefore, comprises two trains. The train having steady marking bias resembles each of the trains in Fig. 8. The train having steady spacing bias resembles each of the trains in Fig. 9.

In the circuit herein, in order to produce a train of signals having steady marking bias followed by another train of signals having steady spacing bias, it is necessary to switch the circuit, in a manner to be explained, during the stop pulse following each signal train.

Refer now to Fig. 11. Fig. 11 shows a succession of signal trains which have switched marking and spacing end distortion. It is a two character cycle, the first signal train having marking end distortion and the second signal train having spacing end distortion. Signal trains having marking end distortion and spacing end distortion, as distinguished from signal trains having marking bias and spacing bias, have start signals of normal duration, whereas signal trains having marking bias and signal trains having spacing bias have start signals of abnormal duration. In steady marking bias the start signal is shorter than normal as shown in Fig. 8. In steady spacing bias the start signal is longer than normal as shown in Fig. 9. In switched marking and spacing end distortion each of the start signals is of normal duration although the start signal in the train having spacing end distortion is displaced from its normal position because each transition of the start signal is delayed. Reference to Fig. 11 shows that for the first train of signals, having marking end distortion, one signal element only is lengthened since there is but one marking signal element among the character determining elements and its mark-to-space transition is delayed. Reference to the train of signals having spacing end distortion shows that the transition from mark to space at the beginning of the start signal is delayed and the transition from space to mark at the end of the start signal is delayed. The delays are of equal amounts and the start signal itself is therefore of standard duration. In the train of signals chosen, for example, there is but one other space-to-mark transition which occurs between the final spacing signal element and the stop signal element; this transition is delayed in spacing end distortion.

In Fig. 11 the switching between the different types of distortion is performed during the start pulse. How this is performed in the circuit herein will be made clear hereinafter. Since in the first train of signal elements the delay is introduced after the switching, which occurs during the start pulse, the first marking-to-spacing transition at the beginning of the first start pulse will not be delayed. Since the delay condition is not changed again until during the start pulse of the succeeding character, the mark-to-space transition of the second character will be delayed. Since, as a result of the switching during the start pulse of the second character, spacing-to-marking transitions are delayed, the spacing-to-marking transition at the end of the start signal will be delayed. Since the delays are equal the start signal will be of normal duration.

Refer now to Fig. 12. Fig. 12 shows a switched combination of all varieties of distortion. It is a four character cycle, the first character has marking end distortion, the second character has marking bias, the third character has spacing end distortion and the fourth character has spacing bias. When trains of signals in accordance with Fig. 12 are produced, switching is performed during every second start pulse. If switching is performed during the first start element, and mark-to-space transitions are thereafter delayed until the second start pulse thereafter, all mark-to-space transitions of marking signal elements, among the character forming signal elements in the first train, will be delayed. The first start signal element itself will be of normal duration. This, as should be apparent from the foregoing produces marking end distortion. The mark-to-space transition at the beginning of the second start pulse will be delayed. The space-to-mark transition at the end of the second start pulse will not be delayed. The second start pulse will be shortened therefore. All mark-to-space transitions in the character forming elements of the second train will also be delayed. This produces marking bias in the second train. The mark-to-space transition at the beginning of the third pulse will also be delayed. The circuit herein will switch the conditions during the start pulse of the third character so as to delay all space-to-mark transitions in the two following signal trains. Therefore, the space-to-mark transition at the end of the third start pulse will be delayed. The delay will equal the delay in the mark-to-space transition at the beginning of the start pulse, so the third start pulse will be of normal duration. All space-to-mark transitions in the succeeding character forming elements of the third train will be delayed. This will produce spacing end distortion. The mark-to-space transition at the beginning of the fourth start pulse will be in the normal position. During the fourth start pulse the condition of the circuit remains unchanged so that delay will be applied to all space-to-mark transitions among the character forming elements. The fourth start pulse will therefore be lengthened. All space-to-mark transitions in the signal element of the fourth train will be delayed. This produces spacing bias in the fourth train.

GENERAL DESCRIPTION

Figures 5, 6, 6A:
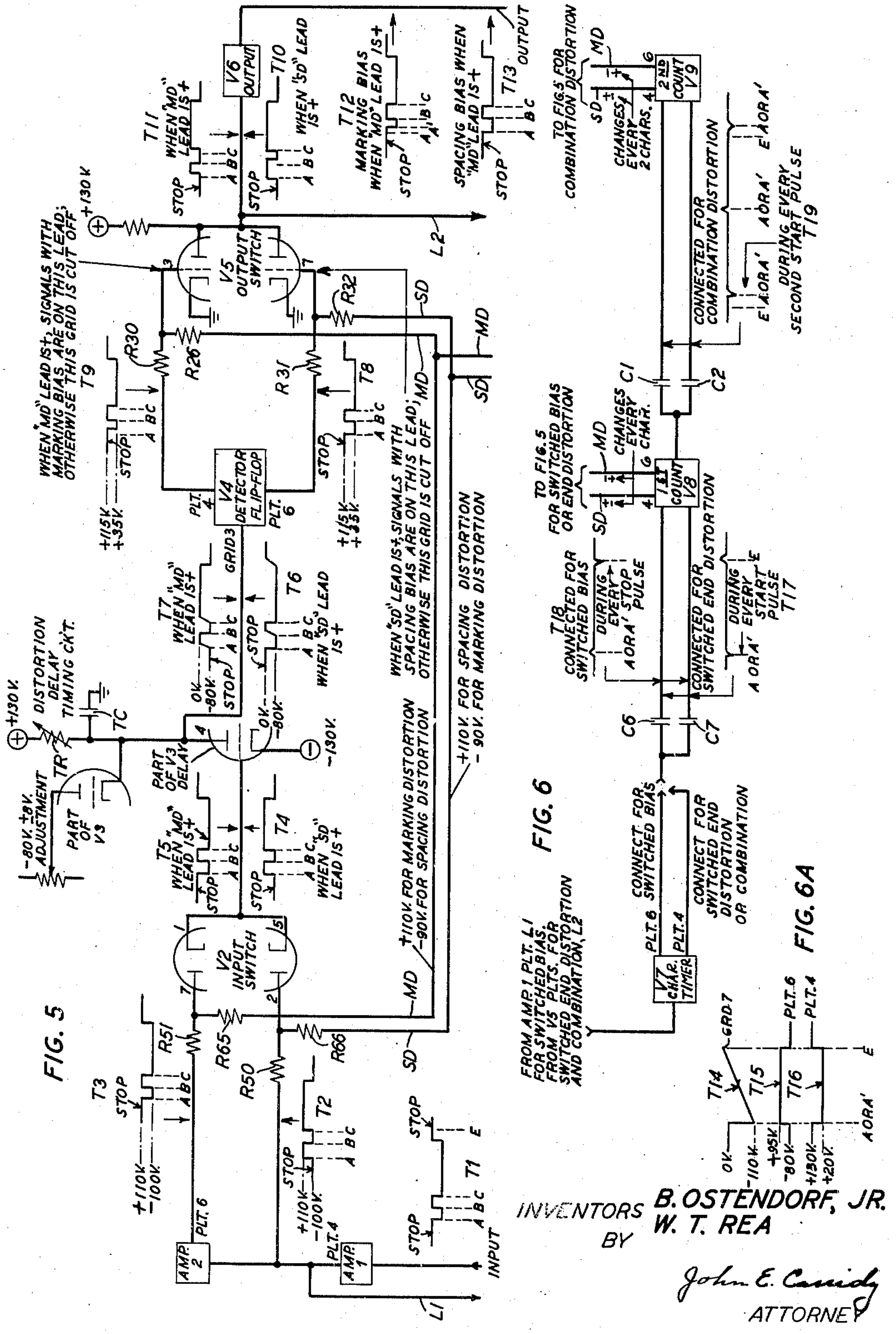
Fig. 5 and Fig. 6 are functional diagrams used in explaining the invention.
Fig. 6A shows graphs of potential changes, used in explaining the invention.

The operation of the circuit will now first be described in a general way with particular reference to the functional diagrams, Fig. 5 and Fig. 6. In the general description, however, reference will be made at times to circuit elements, particularly of various discharge devices, shown in detail in Figs. 1, 2 and 3.

Fig. 5 may be considered as the means for introducing a predetermined amount of distortion into either marking or spacing telegraph signal elements as desired. Essentially it is a signal element transition delay device with an arrangement for applying the delay selectively to either a mark-to-space transition or a space-to-mark transition. Fig. 6 is a timing and control device for Fig. 5. Fig. 6 controls Fig. 5 by applying a condition to the input switch V2 and to the output switch V5. That is to say, it permits signals to pass through either the upper diode of tube V2, while blocking the lower diode, and through the upper triode of tube V5 while blocking the lower triode or vice versa. Fig. 6 is arranged so that it can control Fig. 5 in a number of different manners, so as to produce any of the trains of signals per Figs. 8 to 12 described in the foregoing. In one mode of control, Fig. 6 applies potentials of proper polarity to the two diodes of input switch V2, and to the two triodes of output switch V5, so as to maintain the circuit in such condition that a succession of trains of signals will be passed therethrough, all having the same kind of distortion at a particular time. That is to say, it can permit a succession of trains of signals, each of which trains has marking bias, as per Fig. 8, to be generated in Fig. 5. At another time by reversing the potential conditions applied to the upper and lower diodes of input switch V2, and output switch V5, it can permit a succession of trains of signals to pass, all of which will emerge from Fig. 5 having spacing bias, as per Fig. 9.

Fig. 6 also comprises a timing and counting device. By means of the timing and counting device in another mode of operation, Fig. 6 can time an interval equal in duration to the duration of a single signal train, while applying a positive potential to one of its output leads, MD for instance, and a negative potential to the other, SD for instance, and then reverse the polarity of the signals applied to its output leads SD and MD which interconnect with the SD and MD leads in Fig. 5, respectively. As a consequence of this, a single signal train having a particular kind of bias may be passed through Fig. 5 and then upon the reversal of the polarity of the voltage applied to leads SD and MD and a consequent reversal of the conduction and cut-off condition of the two diodes comprising the input switch V2, and the two triodes of output switch V5, a succeeding train of signals may have signal bias of a different kind. This arrangement of switching after each signal train is used in the production of signals having switched bias and in the production of signals having switched end distortion. A full cycle of signals having switched bias will comprise a signal train having marking bias followed by a signal train having spacing bias as per Fig. 10, then the cycle is repeated successively. A full cycle of signals having end distortion will comprise two signal trains, the first of which will have marking end distortion and the second of which will have spacing end distortion as per Fig. 11. The cycle is repeated successively.

There is yet another timing arrangement in Fig. 6 which times an interval equal in duration to the duration of two trains of signals. This is employed in producing a switched combination of all varieties of distortion per Fig. 12. Such a combination has a four character cycle and the switching is performed every second cycle to produce a four character pattern, the first character having marking end distortion, the second character marking bias, the third character spacing end distortion and the fourth character spacing bias.

In Fig. 6 the two electronic counting devices, first count V8 and second count V9, the first of which switches condition for every character and the second for every two characters, are each flip-flops arranged as binary counters. Flip-flop V8 is arranged so that it can change its condition after an interval equal in duration to the duration of a single character. The duration of the character is measured by the character timer V7. Flip-flop V9 is arranged so that it changes its condition after an interval equal in duration to the duration of two characters. It is controlled from the output circuit of one of a pair of triodes which constitute flip-flop V8. This triode in flip-flop V8 will return to its original condition after every second signal train. At this instant it will apply a condition to the flip-flop V9. Flip-flop V9 will, therefore, change the condition of its output leads every second character and will complete a cycle and return to its original condition every fourth character. Flip-flop V8, called the first count, can, therefore, be employed for performing switching in successive trains which are required to be switched after every train. That is to say, the first count flip-flop V8 may be employed for controlling successive signal trains, one cycle of which constitutes two signal trains, as per Fig. 10 and Fig. 11. Flip-flop V9 may be employed to control the generation of successive signal trains, one cycle of which comprises four signal trains, and in which switching is required to be performed after every second signal train, as per Fig. 12.

As mentioned in the foregoing, the first count flip-flop V8 is arranged so that at times, instead of switching after every signal train, it remains steady in one condition for any desired interval and then may be switched by manual controls so that it remains steady in another of its two possible conditions for another protracted interval. When required to remain in one condition to produce trains of signals having steady marking bias per Fig. 8, or steady spacing bias per Fig. 9, the character timer V7 is disconnected. One of the two triodes of each of the counters is inactivated while the other triode remains activated. In response to this, a positive condition may be applied to one of the diodes of input switch V2 and to one of the triodes of output switch V5 and a negative condition to the other, both for a protracted period. While this condition prevails, successive trains of signals having a particular kind of bias, marking bias, for instance, will be generated in Fig. 5. At another time the condition of multivibrator V8 may be changed by activating the formerly inactivated triode and inactivating the other. This will reverse the polarities applied through conductors SD and MD to the input switch V2 and the output switch V5 and permit trains of signals, all of which have spacing bias, for instance, to be generated in Fig. 5.

The kind of bias which is produced in the system per Figs. 5 and 6, whether marking bias and spacing bias on the one hand, or marking end distortion and spacing end distortion on the other hand, is dependent upon whether or not a transition from marking to spacing or from spacing to marking is delayed with respect to the beginning of the start pulse. Signals are said to have marking bias when the marking-to-spacing transition at the beginning of the start pulse is delayed and all other marking-to-spacing signal transitions are delayed. Signals are said to have spacing bias when the beginning of the start signal is in its proper position with respect to time and all spacing-to-marking signal transitions, including that at the end of the start pulse, are delayed. Signals are said to have marking end distortion when the start pulse is of normal duration and all marking-to-spacing transitions are delayed. Signals are said to have spacing end distortion when both transitions of the start pulse are equally delayed, so that the start pulse is of normal duration, and all spacing-to-marking transitions are delayed.

In the foregoing it was mentioned that Fig. 7 shows a typical signal train having five character determining elements. In this train the signal elements are each assumed to be of standard duration for a particular speed of operation. It is assumed that the typical signal train shown in Fig. 7 is applied to the input of amplifier 1 in Fig. 5. It is represented in Fig. 5 as signal train T1. The symbols such as PLT4, PLT6 and the numerals such as 2, 7, 5 and 1, applied to the elements of the thermionic devices appearing in Fig. 5 and Fig. 6, correspond to the designations of elements shown in detail on the detailed drawings Figs. 1 and 2. The train T1 applied to amplifier 1 will appear on plate 4 of amplifier 1 as the train T2. The positive pulses of the train T1, as is apparent from inspection of train T2, have become negative and vice versa. The train T2 is applied to three circuit branches. It is applied through resistor R50 on the anode 2 of the lower diode of input switch V2. It is applied through conductor L1 to the character timer V7 of Fig. 6. The reason for this will be explained hereinafter. It is applied also to the input of amplifier 2 to produce the reinverted train T3 on plate 6 of amplifier 2. Amplifiers 1 and 2 serve by their limiting action to remove any roundness in the signals. Trains T2 and T3 are applied through resistors R50 and R51, respectively, on the anodes 2 and 7, respectively, of input switch V2.

A potential polarity condition will be applied on conductors SD and MD from the output of the first count V8 or the output of the second count V9, in a manner to be described, dependent upon the manner in which relay switches, not shown in Fig. 5 and Fig. 6 are set, to permit a particular one of trains T2 or T3 to be passed through the lower or upper diode of double diode V2, respectively. The duration of the interval, while a particular voltage polarity condition is applied, is determined by which of the two counting circuits is effectively connected to Fig. 5 and upon whether or not the counting circuits are actually counting, that is upon whether or not they are under control of the character timer V7, or are being maintained in a steady unchanging condition, and upon the interval measured by timer V7 according to the adjustment of its time delay circuit for the different speeds of signaling.

When the counters V8 and V9 are being maintained in a steady unchanging condition, at a particular time, a positive potential will be applied to one of the anodes, such as anode 2 of input switch V2, and a negative potential to the other, such as anode 7 of input switch V2. At such time the diode of V2, say the lower diode, to which the steady positive potential is being applied, will conduct, to pass signal train T2, and the other diode of V2 will be cut off, to block signal train T3. This condition may be maintained for any desired interval such as for several minutes. During this interval the conducting diode will continue to conduct and the diode which is cut off will remain in the cut off condition. During this interval assuming the lower diode is conducting, for reasons which will be made clear hereinafter, signal elements having their space-to-mark transitions delayed will pass through the system. The steady potential condition of leads SD and MD may be switched manually through the relays shown in Figs. 1, 2 and 3, at any time desired, so that a positive condition is applied to plate 7 and a negative condition to plate 2 of switch V2. At such time, signals in accordance with train 3 will be passed through the upper diode of V2 and signals in accordance with train T2 will be blocked. When signals per train T3 pass through the upper diode of V2, signal elements of the train will have their marking-to-spacing transitions delayed, in a manner which will be made clear hereinafter.

Signals in accordance with train T4 will pass through the lower diode of V2 and signals in accordance with train T5 will pass through the upper diode when the lower and upper diodes are conducting, respectively. Attention is particularly called to the fact that at any one time only one or the other of trains T4 or T5 will appear in the output of double diode V2. The particular train which is at the moment being passed will appear on the grid of delay triode V3 connected to the output of input switch V2.

A distortion delay timing circuit is connected to plate 4 of delay triode V3. The delay which is introduced in a signal transition depends upon the constants of the resistor TR and capacitance TC which are at the time effectively connected into the circuit, as well as the potential which is applied to the resistor-capacitance circuit. In the detailed circuit per Figs. 1, 2 and 3, as will be made clear hereinafter, the amount of resistance comprising resistor TR in the charging circuit of capacitance TC and the amount of capacitance in the condenser circuit as well as the potentials applied thereto may be adjusted, as required, to delay the transition correspondingly. The potential applied to the resistance capacitance timing device is controlled by a circuit comprising a source of fixed positive potential applied through a variable resistance to a capacitance and by a potentiometer, connected through a triode, arranged as a diode, forming part of tube V3. The potentiometer connects a source of adjustable negative potential to the capacitance to control its potential at the beginning of charging. In the functional diagram per Fig. 5 only one potentiometer and one capacitance are shown. To permit production of different amounts of distortion at different speeds of operation three different potentiometers are connectable into the circuit and the number and magnitude of the resistor capacitance elements are variable under control of the relay switches, shown on the detailed drawings per Figs. 1, 2 and 3, to be explained hereinafter.

When the positive signal elements appear on the grid of delay triode V3, capacitance TC discharges almost instantaneously through the anode cathode circuit of delay triode V3. When conduction through the delay triode V3 is cut off, the capacitance TC charges relatively slowly through its charging circuit. The rate of buildup of positive potential on the left-hand plate of capacitance TC is dependent upon the constants of the resistor elements and the constants of the capacitance elements comprising capacitance TC as well as the potential applied thereto.

Let it be assumed that a train of signals in accordance with train T4 is being applied to the grid of delay triode V3. The first or stop element of train T4 is negative. Delay triode V3 will, therefore, be cut off. The capacitance TC will at this time be fully charged. The potential of plate 4 of delay triode V3 will be positive. See signal train T6. When the leading edge of the stop-to-start signal of train T4, which is a positive transition, appears on the grid of delay triode V3, capacitance TC will discharge immediately through the delay triode. The potential of plate 4 will fall almost instantaneously, as indicated in signal train T6, to its lower level. The potential of plate 4 will remain at this lower level during the duration of the start pulse of train 4. At the end of the start pulse of train T4 there is a transition from positive to negative, as the first signal element following the start pulse is negative. As this transition is applied to the grid of delay triode V3, conduction through it ceases instantaneously. However, the potential of plate 4 does not rise instantaneously, since the left-hand plate of capacitance TC must first be raised in potential as the capacitance is charged. The potential of the plate 4 of delay triode V3 follows the potential of the left-hand plate of capacitance TC. As the potential of the capacitance builds up, the potential of plate 4 builds up, as indicated in train T6. The capacitance TC will not be fully charged until after an interval determined by the constants of the resistor and capacitance circuit. The plate 4 of delay triode V3 will then remain at its higher potential for the balance of the period of the signal element while delay triode V3 remains cut off. Then as train 4 has a negative-to-positive transition, indicated at C in train 4, delay triode V3 will again be activated instantaneously and the potential of plate 4 will fall instantaneously, as indicated at C in train 6. As train 4 remains at its higher level, train 6 will remain at its lower level until the final positive-to-negative transition of train T4 occurs, which will be delayed, as shown in train T6, in a manner which should be understood from the foregoing.

At such time as signals in accordance with train T5 are applied to the grid of the delay triode V3, signals in accordance with train T7 will be generated at the plate 4 of delay triode V3. Attention is called to the fact that the delay of transition, introduced by the delay circuit, is always produced as a result of the impressing of a positive-to-negative going transition on the grid of delay triode V3. Because of the fact that train T2 is an inversion of train T1 and train T3 is a reinversion, the delay introduced by delay triode V3 can be applied to either a positive-to-negative transition of the original signals, or a negative-to-positive transition of the original signals, assuming of course that input switch V2 is conditioned properly to pass the proper train.

Signal trains in accordance with train T6 or train T7 are applied to one grid of one of the triodes of detector V4, which is a double triode arranged in what is known in the art as a flip-flop circuit. That is to say, the two tubes comprising detector V4 are arranged in tandem, with the plate 4 of the first triode connected to the grid circuit of the second triode. Signals applied to the grid 3 of detector V4 will be reproduced on each of plates 4 and 6. On plate 4 they will be inverted. On plate 6 they will be reinverted. Only one of the signal trains so produced will be permitted to pass further, while the other will be blocked in a manner to be made clear hereinafter. The plates 4 and 6 are connected to the grids 3 and 7, respectively, of the output switch V5. Reference to trains T6 and T7 indicates that the lower voltage of the signals in each instance is negative 80 volts and the higher voltage is zero volts. The detector has the characteristic that it remains non-conducting until signals having the higher of these two voltages are impressed on grid 3. If, therefore, a train of signals, such as train T6, is applied to grid 3 of the first triode of detector V4, the first triode will remain in the conducting condition until the beginning of the start pulse, when it will cut off instantaneously, as shown at A in train T8. The first triode of the detector V4 will then remain in the non-conducting condition during the interval AB that the negative 80-volt signal is impressed on its grid as well as during the interval that the signal is changing along the sloping path of the following signal front and until it reaches the higher or zero voltage, at which time the tube will become conducting instantly and remain conducting only during the relatively short signal interval while grid 3 is maintained at zero volts. Since the transition, from a grid voltage of zero volts to −80 volts, at the end of this interval is substantially instantaneous, the detector triode will be inactivated instantly and will remain inactivated during the duration of the four normal spacing signal intervals, plus the interval during which the signal is again rising from −80 volts to zero volts at the beginning of the following stop pulse. In other words each negative-to-positive transition of train T6 will be delayed as shown in train T8, but all signal transitions in train T8 will be substantially instantaneous. Thus, in response to the application of a train of signals, such as train T6, to the grid 3 of the first detector tube in detector V4, a train such as train T8 will be produced on the plate 6 of the second detector tube of detector V4. It will be noted that these signals have been reinverted as a result of the operation of both triodes of the double triode V4. Thus, train T8 affords signals, the spacing signal elements of which have all been lengthened. The signals appearing on plate 4 of the first triode of double triode V4 are applied also through resistor R30 of detector V4 on the grid 3 of output switch V5. However, these signals will be prevented from passing through the upper triode of the output switch V5 in a manner which will now be explained.

It has been explained that only one or the other of the two diodes forming the input switch V2 is permitted to conduct at any one time while a train of signals is passing through the input switch. This, as has been explained, is achieved by making one of the two leads MD or SD positive, while the other is made negative. The MD and SD leads are multiplied, as is apparent in Fig. 5, to the grids 3 and 7 of the upper and lower triodes of output switch V5, respectively. Therefore, signals will be permitted to pass only through either the upper or the lower triode of output switch V5 at any one time. When the SD lead is plus, signals, such as train T8, having spacing bias appear on plate 6 of detector V4 and will be passed through resistor R31 to the grid 7 of output switch V5. At such times, the positive voltage on lead SD will be impressed through resistor R32 and applied on grid 7 of output switch V5, so that signals having spacing bias will appear in the output circuit of the output switch V5. Simultaneously, due to the negative voltage impressed through conductor MD on grid 3, the signals appearing on plate 4 of detector V4 will be prevented from passing through the upper triode of output switch V5.

When, at another time, a signal train such as train T7 is impressed on grid 3 of detector V4, the train will appear as train T9, that is inverted and with its mark-to-space transitions delayed, on plate 4 of detector V4. They will be impressed through resistor R30 on the grid 3 of the upper triode of output switch V5. The delay which is introduced will be added to the marking signal elements. At such time lead MD will be positive and lead SD negative. The positive potential will be applied through resistor R26 on grid 3 of the upper triode of output switch V5 which will conduct. The lower triode of output switch V5 will be blocked.

Signal train T10 shows a train of signals, to which spacing bias has been applied, after the signals have passed through the output switch V5 and signal train T11 shows a train of signals to which marking bias has been applied. Whichever one of these trains is being permitted to pass through the output switch V5 at a particular time will be inverted in the output amplifier V6. Signal trains such as train T10 will appear as train T13, which corresponds to signal train T1 except that all space-to-mark transitions have been delayed. Signal trains, such as train T11, will appear as signal train T12 which corresponds also to signal train T1 except that all mark-to-space transitions have been delayed.

In order to produce a succession of trains of signals, all of which have marking bias, the circuit of Fig. 6 is arranged, in a manner which will be explained hereinafter, so that a positive potential is applied to lead MD in Fig. 6 which connects to lead MD in Fig. 5, and a negative potential is applied to lead SD in Fig. 6 which connects to lead SD in Fig. 5. The circuits are maintained in this condition as long as such signals are desired. If a succession of trains of signals, all of which have spacing bias, are then desired the potential conditions being applied to leads MD and SD are reversed.

If a succession of trains of signals is required from the output of Fig. 5, in which each single train of signals having marking bias is followed by a single train having spacing bias, it is necessary to apply a positive potential to lead MD and a negative potential to lead SD for an interval equal in duration to the duration of one signal train, then reverse the polarities for another interval equal in duration to the duration of one signal train, and then repeat the cycle for as long as desired.

In order to do this it is necessary to measure an interval equal in duration to the duration of a signal train and maintain the potential conditions applied to conductors MD and SD by the count circuits in a fixed condition during such an interval, then reverse the potential condition applied to leads MD and SD for an equal interval and then repeat the cycle.

It is obviously necessary to impress trains of signals, to which the desired bias is to be applied, to the input lead in Fig. 5, and to synchronize the application of the bias controlling potentials to the leads SD and MD with the occurrence of a particular predetermined point in time of the applied signal trains. The synchronizing pulses are obtained from the output of amplifier 1 over lead L1 for trains such as Fig. 10 and from the output of output switch V5 over lead L2 for trains such as Fig. 11 and Fig. 12.

The timing is performed by the character timer V7 which is a one shot multivibrator. Timer V7 receives its controlling pulses for trains of signals having switched bias per Fig. 10 from the output of amplifier 1 in Fig. 5. The potential transition in the output of amplifier 1 is produced by the stop-to-start transition in a signal train, which is the first signal transition in a train, which is applied to the input circuit of the one shot multivibrator character timer V7. In response to this, the first triode of the timer, which is normally inactivated, fires instantly and, in response to the firing, charges a resistance-condenser timing circuit, the constants of which are selected to measure an interval slightly shorter in duration than the duration of a single signal train. The condenser applies a controlling potential to the input of the second triode of the character timer 7 for this interval. The second triode, which is initially activated, cuts off instantly, at the instant of the first or stop-to-start signal transition of train T2 and remains cut off under control of the resistance capacitance timing circuit for an interval slightly shorter than the duration of one signal train. At the end of this interval the charge on the capacitance in the timing circuit has leaked off so that the second triode is reactivated. During this measured interval, succeeding potential transitions in the signal train, such as train T2, in the output of amplifier 1 will be applied to the input circuit of the first triode in the character timer. However, the first triode will be locked in its activated condition during the measured interval by the potential condition of the plate of the second triode of the timer, which is connected to the grid of the first triode.

In response to the changes in the conducting conditions of the two triodes of the timer, there will be changes in the potential of the plate of its first triode, plate 4, in the plate of the second triode, plate 6, and in the grid of the second triode, grid 7, as shown in Fig. 6A.

The potential values cited hereinafter are by way of example.

Reference to the bottom graph in Fig. 6A shows that the potential of plate 4, just before the first, or stop-to-start signal transition, when the first triode is inactivated, is +130 volts, and that it has a negative going transition from +130 volts to +20 volts in response to the first transition. It remains at this potential, +20 volts, throughout the interval until the following stop pulse occurs, under control of the plate of the second triode and then the first triode is again cut off and the potential of its plate 4 rises again to +130 volts. It will be observed that plate 4 of triode 1 has a negative going transition at the time of the first, or stop-to-start signal transition of a signal train.

The top graph in Fig. 6A shows the potential conditions of grid 7 of the second triode of timer V7. Before the reception of the start pulse it is at zero volts. When triode 1 of character V7 is activated, and its plate 4 responsively goes negative, a negative going charge is applied to a condenser timing circuit connected between the plate of triode 1 and the grid 7 of triode 2, which grid goes to −110 volt responsively almost instantly. Then, as shown in the graph for grid 7 in Fig. 6A, the negative charge leaks off relatively slowly, while the potential of the grid rises as shown in the graph, until, at a predetermined instant during the succeeding stop pulse, it has become sufficiently positive to fire triode 2 of the timer V7.

The middle graph shows the potential conditions of the plate 6 of triode 2 of timer V7. During the stop pulse, triode 2 has been activated. Its plate, plate 6, therefore, is at its lower potential, −80 volts. It is cut off in response to the first signal transition, the stop-to-start transition of a signal train. Its plate, plate 6, responsively goes positive instantly, +95 volts. The second triode remains cut off during the interval until its grid 7 becomes sufficiently positive during the following stop pulse. Then, triode 2 is activated. Its plate, plate 6, responsively has a negative going, substantially instantaneous transition during the following stop pulse.

Attention is particularly called to the fact that a negative going potential transition may be obtained from plate 4 of the first triode of character timer V7 in response to the start pulse of a signal train and a negative going potential transition may be obtained from plate 6 of its second triode during the stop pulse. This is important because, as explained in the foregoing descriptions of the graph of signal trains per Fig. 10, it is required that switching from one type of distortion to another be performed during the start pulse and, for trains such as Fig. 11 and Fig. 12, switching is performed during the stop pulse, and the counters V8 and V9 are arranged to be controlled by negative going transitions of the character timer.

When the counting circuit is actually functioning as a counter, instead of as a source of steady positive and negative potential applied selectively to leads MD and SD, under control of the relay switching circuit, shown in detail in Figs. 3, 4 and 5, the circuit of the first counter V8 is arranged so that it is responsive only to negative going transitions. Such transitions are obtainable from plate 4 of triode 1 of character timer 7 during the stop-to-start transition of a signal train and from plate 6 of triode 2 thereof during a stop pulse. As a consequence of this, successive trains may be switched during start pulses or during stop pulses as required.

The interconnections between Fig. 5 and Fig. 6 extend through the contacts of relays not shown in Figs. 5 and 6 but shown in detail in Figs. 1, 2 and 3. These relays are switched as required to produce the kinds of distortion trains desired. The conductor extending from the output of the output switch V5 is connected at times to the input circuit of the character timer V7. When it is so connected, the character timer will again be responsive to the mark-to-space transition of the start pulse which is the first transition in a signal train. The timer will operate as heretofore described to measure an interval slightly shorter in duration than the duration of a single signal train. However, as should be understood from the foregoing, since the first signal transition of a train may be in its normal position with respect to time or delayed, depending upon the type of bias which is being produced in the system, the interval which is measured will be in the normal position or displaced by an interval equal to the duration of the bias which has been introduced by Fig. 5. The reason for this will become apparent hereinafter.

The operation of the relay switching circuits, variable time delay arrangements, calibrating circuits and other circuit features will be made clear in the detailed description in the following.

Refer now to Figs. 1, 2 and 3 disposed as indicated in Fig. 4. These figures, as has been mentioned, taken together disclose in detail the present signal distortion set, the operation of which has been described in a general way with relation to the functional diagram per Figs. 5 and 6. It is to be understood that, to facilitate the understanding of the operation of the circuit, Figs. 5 and 6 were separated in the foregoing description, whereas in the arrangement per Figs. 1, 2 and 3 they are shown interconnected through relay contacts. The designation of the corresponding elements in Figs. 1, 2 and 3 are identical with those in Figs. 5 and 6. Figs. 1, 2 and 3 each are more complete in that they show various switching elements required for the control of the circuit. They show also in the upper left-hand corner of Fig. 1, by means of a captioned rectangle, a multiple sender circuit, well known in the art, which is capable of producing five unit character defining signals at 60, 75 or 100 words per minute or six unit character defining signals at 53, 60 or 86 words per minute. Either five element signals or six element signals of some one of these speeds may be applied to the input circuit of amplifier 1 at any particular time by the operation of relays K6 and K7 in proper combination in a manner to be described.

Since the circuit is arranged to apply predetermined amounts of distortion to signal trains of differing speeds, the detailed circuit also includes means for changing the constants in the resistor capacitance delay circuit connected to the delay tube. This is controlled through the operation of relays K4, K5, K6 and K7 in a manner to be described. The detailed circuit shows also relays K1, K2 and K3, in the lower portion of Fig. 2, which determine the manner of interconnection of leads SD and MD from the input switch V2 and output switch V5 to the first counter V8 or second counter V9 and the connection of leads L1 or L2 between the character timer and the input switch V2 or the output switch V5.

The circuit of the character timer V7 is required to be adjustable to measure differing intervals for signal trains of differing durations for the differing speeds. This is cared for by selectively connecting one of a number of potentiometers to the resistor through which the capacitance in the timing circuit of timer V7 is discharged under control of relays K6 and K7.

The output circuit of the detailed figures is arranged to apply the biased signals to signals having marking and spacing potentials of differing magnitudes and polarities for various services under control of relays K9, K10, K11, K12, and K13 in Fig. 3 in a manner to be described hereinafter.

Now to point out the correspondence between the tubes of the functional diagrams per Fig. 5 and Fig. 6 and those of the detailed drawings per Figs. 1, 2 and 3, in Fig. 1, double triode V1 is the amplifier 1 and amplifier 2 combined. Amplifier 1 is the left-hand triode of double triode V1 and amplifier 2 is the right-hand triode of double triode V1. Double diode V2 is the input switch. The left-hand diode of double diode V2 corresponds to the lower diode of the input switch V2 in Fig. 5 and the right-hand diode of double diode V2 in Fig. 1 corresponds to the upper diode of input switch V2 in Fig. 5. The left-hand triode of double triode V3 corresponds to the delay triode in Fig. 5 and the right-hand triode of double triode V3 in Fig. 1 is part of the calibration adjustment arrangement of the distortion delay timing circuit shown in the upper middle portion of Fig. 5. Double triode V4 of Fig. 2 corresponds to the flip-flop detector V4 in Fig. 5. Double triode V5 corresponds to the double triode output switch V5 in Fig. 5. Pentode V6 in Fig. 1 corresponds to the output amplifier V6 in Fig. 5. Double triode V7 in Fig. 1 corersponds to the character timer V7 in Fig. 6. Double triode multivibrator V8 in Fig. 1 corresponds to the first count multivibrator in Fig. 6. Double triode multivibrator V9 in Fig. 1 corresponds to the second count multivibrator V9 in Fig. 6.

DETAILED DESCRIPTION OF OPERATION

The details of the operation of all of the relay switching circuits of Figs. 1, 2 and 3, except the battery supply circuits for the thermionic devices, will be described hereinafter in a separate section under the heading Switching Relay Circuits.

Relay K8 will be operated whenever the system is in operation. When relay K8 is operated, positive potential, which may be, for instance, 130 volts, is supplied through resistor R200, resistor R59, contact 5 of relay K8, and resistors R52 and R54 to plate 4 and resistor R53 to plate 6 of double triode V1, respectively, and through resistor R33 to plate 4 and resistor R34 to plate 6 of double triode V4, respectively. The positive 130-volt supply extends through resistor R25 to plate 4 of double triode V5, through resistor R80 to plate 4 and resistors R79, R78 and R18 to plate 6 of double triode V7, respectively. It extends through resistor R43 to plate 4 and resistor R46 to plate 6 of double triode V8, respectively. It extends also through resistor R47 to plate 4 and resistor R74 to plate 6 of double triode V9, respectively.

Negative 130-volt potential, for instance, is connected to one terminal of a potentiometer circuit which extends through resistors R205, R64 and R27 to ground. The cathode of tube V6 is connected to the junction of resistors R205 and R64. Both cathodes of tube V5 are connected to the junction of resistors R64 and R27. From the junction of resistors R205 and R64 a circuit extends through conductor 160 and resistor R62 to the anode 6 and grid 7 of tube V3, and to the adjustable arms of the three potentiometers comprising resistors R87, R88 and R89, each of which is selectively connectable to ground through contact 2 of relay K8 under control of relays K6 and K7. To anticipate each of these potentiometers is selectively connectable under control of relays K6 and K7, and the right-hand triode of tube V3, arranged as a diode, to the delay capacitances, to be described hereinafter, and in parallel to the anode 4 of tube V3, to control the initial potential applied to the capacitances in the delay circuit associated with the left-hand triode of tube V3. The negative potential from the potentiometer circuit is connected also through resistor R60 to the cathode 2 of tube V3, to the cathodes 2 and 8 of tube V1 and to the cathode 8 of tube V7. Negative 330-volt potential, for instance, is connected through resistor R56 to grid 3 of tube V1, through resistor R57 to grid 7 of tube V1, through resistor R42 to grid 3 of tube V3 and in parallel through resistor R41 to anodes 1 and 5 of tube V2. The —330 volt potential supply is connected also through resistor R40 to grid 7 of tube V4, through resistor R22 to grid 1 of tube V6, through resistor R1 and R3 to grid 3 of tube V9, through resistors R6 and R5 to grid 7 of tube V9, through resistors R13 and R15 to the grid 7 of tube V8 and through resistors R9 and R12 to the grid 3 of tube V8.

*Character timing*

Because switching between marking and spacing distortion is done at definite points in time of a telegraph code character, it is necessary that the electronic switching circuit operate in synchronism with the incoming or outgoing code characters. Synchronism is maintained by the character timing circuit associated with character timer V7. Character timer V7 is connected as a one shot multivibrator with resistor-dry rectifier coupling comprising resistor R17 and dry rectifier units CR1, CR2 and CR3 from the plate 6 of the right triode of character timer V7 to the grid of its left triode, and condenser coupling C10 between the plate 4 of the left-hand triode and the grid of the right-hand triode. Telegraph signals for synchronizing purposes, for switched bias trains, such as Fig. 10, are supplied over a circuit to be traced hereinafter from the plate circuit of the left-hand triode of double triode V1 to the grid of the left-hand triode of double triode V7. For trains of signals such as those of Fig. 11 and Fig. 12 the control impulses for timer V7 are supplied from the output circuits of output switch V5, over a circuit to be traced hereinafter, to grid 3 of timer V7. In either case, the voltage for marking is relatively negative and the voltage for spacing is positive. This is apparent from reference to signal train T2 and signal trains T10 and T11 in Fig. 5. It will be observed that the stop signal element in each instance is relatively negative and the start signal in each instance is relatively positive, so that the first signal transition in each instance would be a negative-to-positive going potential transition. When the system is in the stopped condition, which is the marking condition, two negative voltages are impressed on the left grid of timer V7 since the signal voltage supplied from either amplifier 1 of double triode V1 or output switch V5 is negative and the feedback voltage from plate 6 of timer V7 through resistor R18, varistors CR3, CR2, CR1 and resistor R17 is negative. The feedback voltage is negative because the right diode of timer V7 is conducting. The right triode is conducting because the grid resistor R19 returns to a positive voltage supplied through the calibrating potentiometers. The calibrating potentiometer circuit will be explained in detail hereinafter. Since both voltages on the left grid 3 of timer V7 are negative, the left triode is cut off. In response to the first positive going transition resulting from the stop-to-start transition at the beginning of a signal train, applied through resistor R45, the left triode of timer V7 will conduct and instantly drive the right grid timer V7, through condenser C10, to cut off. Because the right plate 6 of timer V7 is now positive, the circuit connecting the right plate 6 and the left grid 3 will hold the left triode conducting. Notwithstanding the occurrence of subsequent negative going transitions, due to marking signals, received through resistor R45 on grid 3 of timer V7, the left triode of the timer will continue to conduct, as the constants of the right-hand grid circuit of timer V7 are arranged so that the cut off voltage supplied through condenser C10 will not leak off through resistor R19 until sometime during the following stop pulse of the telegraph signal train. At this instant the right triode of timer V7 will conduct and the left triode will become cut off since both voltages applied to its grid 3 are now again negative. After a few milliseconds for condenser C10 to reach steady state, the character timing circuit is ready for the next character.

It is to be understood that the duration of a signal train will differ for the different signaling speeds. The timed interval of the condenser resistance timing circuit of timer V7 must therefore be adjustable. This is cared for by three different potentiometers selectively connectable to resistor R19 under control of relays R6 and R7 which will be explained hereinafter.

As previously stated, the left side of the character timer V7 becomes conducting immediately after a start element has been received. Accordingly, it will have a negative going transition on its plate at this time. A negative going transition occurs on the right plate of timer V7 after the chartcer has been completed and the stop element is being received. Therefore, negative pulses may be derived from the right plate of timer V7 during stop elements, and from the left plate during start elements. Either type of negative pulses may be used in synchronizing the circuit dependent upon what type of distortion train is desired as explained in the following section.

*Character counting circuit*

Because a cycle of switched bias or a cycle of end distortion consists of two signal trains and a cycle of combination distortion consists of four signal trains, a circuit associated with the first counter V8 is provided to divide the character frequency by two and a circuit associated with the second counter V9 is provided to divide the character frequency by four.

The first counter V8 is connected as a flip-flop circuit with plates and grids cross-connected by resistor R10 which interconnects plate 6 to grid 3 and resistor R16 which interconnects plate 4 to grid 7. Each time one of the triodes of first counter V8 becomes conducting, the resulting drop in the plate voltage of the conducting triode cuts off the other triode. Sharp negative pulses are applied simultaneously to both grids of first counter V8 by way of condensers C6 and C7. These pulses are derived from the plate voltages of character timer V7 and may come from either the right plate or the left plate of timer V7 depending upon whether or not relay K3 is operated or released. The circuits will be traced hereinafter. Pulses from the right plate of timer V7 are used in generating switched bias and pulses from the left plate of timer V7 are used in generating switched end distortion and combination distortion. These negative pulses are amplified by whichever section of counter V8 happens to have been conducting, and by the flip-flop action, the condition of conduction is interchanged between the two sections of counter V8. Action of second counter V9 is identical to that of first counter V8 except that firing pulses are derived only from the left plate of counter V8. The circuit may be traced from plate 4 of counter V8 through condenser C1, resistor R2 and resistor R3 to grid 3 of the left triode of counter V9 and in parallel through condenser C2, resistor R7 and resistor R5 to grid 7 of the right triode of counter V9. Since each of the counting stages of counter V8 and counter V9 flips one way or the other for every applied input pulse, it therefore requires two successive input pulses for counter V8 to return to its original condition and similarly counter V9 will return to a given condition once for every four input pulses applied to counter V8. Accordingly, the plate voltages of counter V8 are used for producing switched bias and end distortion which require switching every character, while the plate voltages of counter V9 are used for producing combination distortion which requires switching every other character. Transfer contacts on relays K2 and K3 connect the plate voltages of first counter V8 or second counter V9 to the distortion switching circuits by way of the MD or SD leads. The circuits will be described hereinafter.

The plate voltages from first counter V8 or second counter V9, dependent upon which counter is being used, determine whether mark-to-space or space-to-mark transitions are to be delayed. When the plate of the left triode in the first counter or in the second counter is positive, space-to-mark transitions are delayed producing spacing bias and when the plate of the right triode in either counter is positive, mark-to-space transitions are delayed producing marking bias. The instant in which the counting circuit which is being employed changes the potential conditions applied to the MD and SD leads is the instant in which the distortion which is being produced is switched in successive trains of signals.

In the production of successive trains of signals having steady marking bias, as in Fig. 8, or steady spacing bias as in Fig. 9, the potential conditions supplied from whichever counting circuit is being employed at the time remain fixed. In other words the counters do not function as counters for this condition. The character timer is disconnected and the cathode circuit, of one of the triodes in the counter which is being employed is opened. Under such circumstance the other triode in the counter will be activated. A positive potential will be supplied from the plate circuit of the inactivated triode and a negative potential will be supplied from the plate circuit of the activated triode.

*Input amplifiers*

Telegraph signals of the electronic hub variety are supplied by the multiple sender circuit at the upper left in Fig. 1. These signals are supplied through resistor R55 to the left grid of amplifier V1. The circuit will be traced hereinafter. Limiting action of the left triode removes any roundness or irregularities of the input wave. Plate signals of the left triode of amplifier V1 are coupled to the grid of the right triode of amplifier V1 by resistor R58. The voltage supplied from resistor R54 in the plate circuit of the left triode of amplifier V1 will be negative for marking. The voltage supplied from resistor R53 in the plate circuit of the right triode of amplifier V1 will be positive for marking.

*Input switch*

Voltage from the left triode of first counter V8, or second counter V9, depending upon the condition of relays K2 and K3, is impressed on the left diode of input switch V2. Consequently, the left diode of input switch V2 will be biased beyond cut off when the left triode of counter V8 or the left triode of counter V9 is conducting since under these circumstances a negative potential will be supplied from the left triode of whichever counter is being employed. Similarly, voltage from the right triode of first counter V8, or from the right triode of second counter V9, dependent upon which counter is being employed, is impressed on the right diode of input switch V2. Anode 2 of the left diode of input switch V2 is connected through resistor R50 to plate 4 of the left triode of amplifier V1. Anode 7 of the right diode of input switch V2 is connected through resistor R51 to plate 6 of the right triode of amplifier V1. When the left triode of first counter V8, or the left triode of second counter V9, whichever is being employed, is non-conducting and the potential derived from its plate circuit is positive, the left diode of input switch V2 will pass signals to its cathodes, the polarity of which signals is plus for space and is minus for mark. When the right triode of counter V8, or the right triode of counter V9, whichever is being used, is non-conducting and therefore furnishing a positive potential, the right diode of input switch V2 will pass signals whose polarity is positive for mark and negative for space. Both of the cathodes of input switch V2 are connected together and their signals are connected by way of resistor R41 to the grid of the left triode, or delay triode of double triode V3.

*Transition delay circuit*

The delay circuit consists of condenser C14, Fig. 2, condenser C17 and condenser C18, both in Fig. 1, and their associated charging resistors which are selectively connectable in the plate circuit of the left-hand or delay triode of double triode V3, when the circuit is controlled, in a manner to be described, by the relays and switches in Fig. 2 and Fig. 3. The circuit is arranged so that one or more of capacitances C14, C17 and C18 are selectively connected in parallel to the anode 4 of delay triode V3. The condensers are charged from +130 volts, for instance, through resistors, the magnitude of which is adjustable for the different amounts of distortion desired. The initial charge on the capacitances is adjustable by means of three individual potentiometers which are selectively connectable through relays R6 and R7 and through the right-hand triode of tube V3, arranged as a diode, to the capacitances. These circuits will be traced hereinafter.

When a positive signal appears on grid 3 of the left-hand triode of double triode V3, plate current in this triode immediately ceases, and a smaller current flows into whichever condenser arrangement is being employed. This charging current is supplied from a battery which may be, for instance, a positive 130-volt battery and is controlled by the amount of resistance in circuit as set by selector switches S1 and S2 in Fig. 3 for discrete percentages of distortion over a range from 0 to 45 percent or as determined by the setting of relays K4 and K5 for fixed percentages of distortion, such as 25 percent, 30 percent and 35 percent. The circuits will be described hereinafter. The amount of capacitance in the circuit for different speeds of operation may be varied by controlling relays K6 and K7. As charging current flows into the condenser its voltage rises until it reaches approximately zero. The plate of the left-hand triode of double triode V3 is connected through resistor R37 to grid 3 of the left-hand triode of the detector V4. When the voltage of the plate 4 of the left-hand or delay triode of double triode V3 reaches approximately zero, the left-hand triode of detector V4 will conduct. The plate 4 of the left-hand triode of detector V4 is coupled to the grid 7 of its right-hand triode through resistor R35 and condenser C13. The two cathodes 2 and 8 of detector V4 are connected together and through resistor R77 and resistors R83 and R82 to ground. Detector V4 acts as a flip-flop circuit. Current in one section instantly cuts off current in the other. This flip-flop action serves to square up the sides of the distorted signals. A further connection to grid 7 of detector V4 is through resistor R36, the function of this will be described later. The time which elapses between the instant that the left-hand triode of double triode V3 is cut off and the time the left-hand triode of detector V4 conducts is the delay period. Only positive-to-negative transitions appearing at the grid 3 of the left-hand triode of double triode V3 are delayed. Consequently, if telegraph signals of positive marking polarity appear on this grid, the mark-to-space transition, which is a positive-to-negative transition, will be delayed, producing marking bias. Signal trains in which the spacing signal elements are positive applied to grid 3 of the delay triode V3 will have their space-to-mark transition, which is a positive-to-negative transition, delayed, producing spacing bias.

Because the detector circuit is a twin triode flip-flop circuit, a first signal train having particular polarities will appear on one of its plate circuits and a second signal train having opposite polarities from the first train will appear on the other of its plate circuits.

*Output switch*

Resistors R30 and R31 will carry the distorted telegraph signals of opposite polarity. For a given setting of the input switch circuit only one polarity will be correct. The output switch circuit V5 is designed to select the correct signal train.

Output switch V5 is a double triode with a common plate resistor R25. Grid 3 is connected through resistor R30 to plate 4 of detector V4 and grid 7 is connected through resistor R31 to plate 6 of detector V4. Each grid is also connected individually to the plate of one of the triodes of the first counter V8 or to the plate of one of the triodes of the second counter V9, dependent upon the position of the interconnecting relays. Whichever grid of output switch V5 is receiving negative bias from first counter V8 or second counter V9 is prevented from conducting, regardless of the telegraph signals impressed upon it. The correctly polarized signals are those which cause current to flow in output switch V5 for marking and no current for spacing.

A minor circuit function is performed by the connection between the grid 7 of detector V4 through resistor R36 and contact 9 of relay K3, when operated, to the plate 6 of character timer V7. This function is required to be performed only when trains of signals having switched bias are being produced in which case relay K3 will be operated. At such time, voltage from resistor R36 holds the right triode of detector V4 cut off during that part of a stop element which occurs immediately after switching from the marking-to-spacing condition, while the delayed timing condenser C14 is charging positively. Were it not for this connection, a "hole" would be produced in the middle of every second stop element.

*Output amplifier*

Output amplifier V6 is a power pentode, the plate of which connects, over a circuit to be traced hereinafter, to an externally provided hub potentiometer comprising resistors R98 and R99 in Fig. 3. This potentiometer produces a voltage such as, for instance, +60 when no current is drawn from its center point. Pentode V6 has its cathode connected to −130 volts, and when its grid is positive a plate current of 30 milliamperes is drawn from the hub potentiometer. The current is sufficient to drop the potentiometer voltage to −30 volts, for instance. These voltages correspond to those used for the signals produced on electronic hub circuits, well known in the art.

The grid of output pentode V6 is connected through resistor R24 to the plates 4 and 6 of the output switch V5. As mentioned in the preceding paragraph, the potential on resistor R24 is negative for marking and positive for spacing, so that the output tube draws current for spacing and is cut off for marking.

SWITCHING RELAY CIRCUITS

All circuit variables are under control of switching relays. The switching circuits will now be described.

*Marking bias*

For trains of signals having steady marking bias relays K1 and K2 are operated and relay K3 is released. For the operation of relays K1 and K2 a circuit may be traced from negative battery through the right-hand winding of relay K2 in parallel with a circuit from negative battery through the left-hand winding of relay K1 and the circuit then extends through contact 2 of switch S4, contact 4 of switch S4, conductor G into Fig. 3 where it is extended through contact 4 of relay K9 to ground when relay K9 is released, or through contact 6 of relay K12 to ground when relay K12 is operated. The manner in which relays K9 and K12 are controlled will be described hereinafter. With relays K1, K2 and K3 in this condition, cathodes of the right-hand triodes, of each of counters V8 and V9, are opened so that each of these triodes is non-conducting. The circuit may be traced from the cathode 8 of each of these triodes in parallel to contact 5 of relay K2 and to contact 2 of relay K1, both of which are opened. The raised potential of plate 6 of counter V8 will be impressed through contact 2 of relay K2 on parallel branches, one of which extends through resistor R65 to anode 7 of the input switch V2 and the other of which extends through resistor R26 to grid 3 of output switch V5. The lowered potential of plate 4 of counter V8 will be impressed through contact 4 of relay K2 on parallel circuits, one of which extends through resistor R66 to anode 2 of input switch V2, and the other of which extends through resistor R32 to the grid 7 of output switch V5. This will permit signals, to which marking bias is applied, to pass through the system and will prevent signals to which spacing bias is applied from passing through the system.

*Spacing bias*

For the production of trains of signals having steady spacing bias, relay K1 is operated and relays K2 and K3 are released. To produce this condition, a circuit may be traced from negative battery through the right-hand winding of relay K1 and through contact 3 of switch S4, which is closed for this condition, to ground through contact 4 of relay K9 when released or contact 6 of relay K12 when operated. Under this condition a circuit may be traced from cathode 2 of each of the left triodes of counter V8 and counter V9, in parallel, to open contact 6 of relay K2 and open contact 2 of relay K1. For this condition the left-hand triodes of each of the counters will be inactivated. The controlling potentials in this instance are obtained from counter V9. It is to be understood, of course, that the character timer V7 is disconnected whenever steady spacing bias or steady marking bias is being produced. A positive potential is impressed from plate 4 of counter V9 through contact 1 of relay K3 and contact 3 of relay K2 to parallel branches. One branch extends through resistor R66 to anode 2 of input switch V2. The other parallel branch extends through resistor R32 to grid 7 of output switch V5. A negative potential will be impressed from plate 6 of counter V9 through contact 5 of relay K3 and contact 1 of relay K2 on parallel branches. One branch extends through resistor K65 to anode 7 of input switch V2 and the other branch extends through resistor R26 to grid 3 of output switch V5. Under these conditions, signal trains to which spacing bias will be applied pass through the system.

*Switched bias*

A succession of trains having switched bias is a succession in which a train of signal elements having marking bias is succeeded by a train in which the signal elements have spacing bias. For the production of such trains, as explained heretofore, it is necessary that the character timer V7 be employed in order to measure intervals equal in duration to the duration of a signal train. The first counter V8 is employed since switching is performed after each signal train. Further, switching is performed during the stop interval and, since, as explained heretofore, a negative-going transition from the character timer V7 is required to control the counter V8, it is necessary to select the anode of the character timer which has a negative-going transition at the beginning of the stop pulse. Reference to Fig. 6A shows that such a condition is obtained from plate 6 of the character timer. And finally the control of the character timer is required to be from the left-hand triode of amplifier V1.

To produce this condition it is necessary that relays K1 and K2 be released and that relay K3 be operated. Relay K3 is operated over a circuit from battery through the winding of relay K3 to parallel branches. One branch extends through conductor B into the line concentrating unit test circuit and through control therein to ground. Another path for operating relay K3 extends through contact 1 of switch S3, when operated, through contact 1 of switch S4, when operated, contact 4 of switch S4, conductor G, from Fig. 2 into Fig. 3, to ground on contact 6 of relay K9, or through contact 6 of relay K12, when operated, in a manner to be described, to ground.

The control circuit for the timer may be traced from the junction between resistor 52 and resistor 54 in the circuit of plate 4 of amplifier V1 through contact 8 of relay K3 and resistor R45 to grid 3 of timer V7. The control circuit for the counter V8 may be traced from the junction of resistors R18 and R78, in the circuit of plate 6 of timer V7, through contact 4 of relay K3, contact 1 of relay K1 to parallel branches, one of which extends through condenser C6, resistor R11 and resistor R12 to grid 3 of counter V8, and the other of which extends through condenser C7, resistor R14 and resistor R15 to grid 7 of timer V8. A negative impulse is, therefore, impressed on each of the grids of counter V8 at the beginning of every stop pulse of each signal train in a succession of signal trains. The first negative pulse may be applied when either the right triode or the left triode of counter V8 is conducting. Whichever one is conducting is instantly cut off and responsively the other of the triodes of counter V8 is activated. As a result of this, the potentials applied from the output circuit of each of these triodes is reversed during the stop pulse of each signal train.

The control circuit of switches V3 and V5 may be traced for this condition from plate 4 of counter V8 through contact 2 of relay K3 and contact 3 of relay K2 to the SD conductor. Another circuit may be traced from plate 6 of counter V8 through contact 6 of relay K3 and contact 1 of relay K2 to the MD conductor. The remaining portions of each of the circuits of the SD and MD conductors have been heretofore traced. Thus the potentials applied to the anodes of input switch V2 and the grids of output switch V5 will be reversed after the passage of each signal train. Therefore, a train of signals having marking bias, for instance, will be permitted to pass through the system, and then the system will be switched and thereafter a train of signals having spacing bias will be permitted to pass. Then the cycle may be repeated as long as desired.

*Switched end distortion*

Switched marking and spacing end distortion, as shown in Fig. 11, is a succession of trains of signals in which a train having marking end distortion is alternated with a train having spacing end distortion and in which the switching is performed during the start pulse of each signal train. Reference to Fig. 6A indicates that a negative-going transition during the start pulse may be obtained from plate 4 of the character timer V7. For the present condition it is required that relays K1 and K3 be released and that relay K2 be operated. Furthermore, for this condition, output switch V5 controls the character timer. The instant of switching is required to be at the beginning of the start pulse derived from output switch V5. Switching is required after every signal train, so that first counter V8 is employed. In order that relay K2 may be operated, a circuit is establishable from battery through the left-hand winding of relay K2, contact 3 of switch S3, contact 2 of switch S3, contact 1 of switch S4, which is closed for this condition, and contact 4 of switch S4 to ground at contact 4 of relay K9, or contact 6 of relay K12. A parallel circuit through conductor B permits control in the time concentrating unit test circuit. The control circuit for the timer V7 may be traced from anodes 4 and 6 of output switch V5, which are connected in parallel, through contact 7 of relay K3 and resistor R45 to grid 3 of timer V7. The control circuit for first counter V8 may be traced from the lower terminal of resistor R80, in the circuit of plate 4 of timer V7, through contact 3 of relay K3 and contact 1 of relay K1 to condensers C6 and C7 in parallel, which connect to the grids 3 and 7 of first counter V8, through circuits heretofore traced. The output circuit of counter V8 may be traced from plate 4 thereof through contact 4 of relay K2 to conductor SD and from plate 6 of timer V8 through contact 3 of relay K2 to conductor MD.

*Switched combination of distortion*

Reference to Fig. 12 indicates that the switching for this signal pattern occurs during the start pulse of every second character. This requires that the negative-going potential for the control of the timer be obtained from plate 4 of timer V7. Furthermore, it is required that the control of the potentials applied to the MD and SD leads be obtained from the second counter V9. A further requirement, because of the delayed start pulse transition, is that the control of the timer be obtained from output switch V5. All of these conditions will be met with relays K1, K2 and K3 all released.

The circuit for the control of the timer extends from plates 4 and 6 of output switch V5, connected in parallel, through contact 7 of relay K3 and resistor R45 to grid 3 of timer V7. The circuit for the control of the counter extends from the lower terminal of resistor R80, in the circuit of plate 4 of timer V7, through contact 3 of relay K3 and contact 1 of relay K1 to condensers C6 and C7 in the grid circuit of first counter V8. It will be observed that plate 4 of the counter V8 connects through condenser C1 and resistors R2 and R3 to grid 3 of second counter V9 and in parallel through condenser C2 and resistors R7 and R5 to grid 7 of counter V9. Counter V8 will return to its original condition after every second train and counter V9 after every fourth train. Plate 4 of second counter V9 is connected through contact 1 of relay K3 and contact 3 of relay K2 to conductor SD and plate 6 of counter V9 is connected through contact 5 of relay K3 and contact 1 of relay K2 to conductor MD. The potential conditions applied to conductors SD and MD will be reversed every second pulse and the circuit will be restored to its original condition every fourth pulse.

*Five-unit code, six-unit code*

The circuit, as stated hereinbefore, is arranged so that bias may be applied to signal trains having different speeds and different numbers of units. When relay K14 is released, as shown, the signals furnished through its back contacts are so called five-unit signals. Signal trains each having five character-forming units and of any of three different speeds may be obtained from the multiple sender circuit through the back contacts of released relay K14. When relay K14 is operated signal trains each having six character-forming units and of any of three other different speeds may be obtained through the front contacts of operated relay K14. The speeds for the five-unit code are 60, 75 and 100 words per minute and for the six-unit code are 53, 66 and 86 words per minute. Relay K14 is controlled over a circuit from battery through the winding of relay K14 and conductor 150 which extends into Fig. 2 and is formed into parallel branches one of which extends through conductor X and a control, not shown and which may be open or closed, to ground in the line concentrating unit test circuit, well known in the art, and indicated by a captioned rectangle in Fig. 2. The other parallel branch extends to the contact of key S6. When the key S6 is closed the circuit continues through conductor S to parallel branches in Fig. 3. One branch extends through contact 3 of relay K9, when relay K9 is released, as shown, to ground. The other branch extends through contact 4 of relay K12, when relay K12 is operated to ground.

In order to supply ground to the start lead ST of the particular pair of conductors which is employed, relay K8 is operated over a circuit from battery through the winding of relay K8, conductor 154, through Fig. 2 into Fig. 3, where it extends through contact 2 of relay K9, when relay K9 is operated to ground or through contact 5 of relay K12 when relay K12 is operated to ground.

*100 speed*

When 100-speed five-unit signals are to be impressed on the present circuit, relays K6 and K14 are released and relay K7 is operated. Relay K8, as stated, is always operated when the circuit is in operation. Relay K7 is operated over a circuit from battery through the winding of relay K7, conductor 151, which extends from Fig. 1 into Fig. 2, and then to parallel branches one of which extends through conductor F into the line concentrator unit test circuit wherein it extends through a control, not shown, which may be open or closed to ground. The other branch of the parallel circuit extends through contact 1 of key S5, when key S5 is operated, and through conductor V into Fig. 3 where it divides into parallel branches. One branch extends through contact 1 of relay K9 to ground when relay K9 is released and the other branch extends through contact 3 of relay K12 when relay K12 is operated to ground. With the circuit in this condition a path may be traced from ground through contact 1 of relay K8, contact 1 of relay K6, contact 2 of relay K7 and contact 8 of relay K14 to the ST 100-speed five-unit conductor which extends into the multiple sender circuit. The return path may be traced from the T 100-speed five-unit conductor, through contact 12 of relay K14, contact 4 of relay K7, contact 3 of relay K6 and through resistors R49 and R55 to the input grid 3 of amplifier 1 of double triode V1. Under this condition 100-speed five-unit signal trains will be applied to the input of the present bias circuit.

When 100-speed signals are being applied to the circuit, the discharge resistor R19 in the timer V7 must be connected to a particular one of the three potentiometers to which it is connectable for the three different intervals it measures for a single train for the three different speeds of operation. For 100-speed signals, with relay K6 released and relay K7 operated as stated, the potentiometer is arranged as follows: Positive battery through resistor R200 and contact 5 of relay 8 is connected to the bottom terminal of resistor R72 to the top terminal of which resistor R19 is permanently connected, this portion of the circuit is invariable. The circuit continues through resistor R73, the slidable arm, resistor R86, contact 8 of relay K7, contact 10 of relay K6, resistor R60 and through resistor R205 to negative battery.

Under this condition the circuit of condenser C14 only will be connected to anode 4 of the delay triode V3. Since with relay K6 released and relay K7 operated the other condensers which may on occasion be connected into the delay circuit, that is condensers C17 and C18, will be effectively disconnected from the circuit.

With the relays in the condition stated, a circuit may be traced from −130 volt battery, through resistor R205, resistor R62, sliding potentiometer arm, resistor R88, contact 6 of relay K7, contact 8 of relay K6, resistor R63 and contact 2 of relay K8 to ground. Plate 6 of triode V3, arranged as a diode, is connected to the left-hand terminal of resistor R62, so that an adjustable negative potential is supplied through this section of tube V3 to the junction between the delay capacitance in the circuit and resistor R39 in series with plate 4 of the delay triode. This permits the potential from which the delay condenser starts to charge to be varied. A different potentiometer, such as that comprising R88, is selectively connectable in the delay circuit for each of the different speeds of operation.

*75 speed*

When 75-speed five-unit code signals are to be impressed on the grid 3 of amplifier V1, relays K14 and K7 will be released and relays K6 and K8 will be operated. The circuit for the operation of relay K6 may be traced from battery through the winding of relay K6 and conductor 155, which extends from Fig. 1 to Fig. 2 where it divides into parallel branches. One branch extends through conductor E into the line concentrating unit test circuit where it extends through a control by which it may be grounded. The other branch extends through contact 1 of relay S5 and conductor V into Fig. 3 where parallel branches are formed. One branch extends through contact 1 of relay K9 to ground and the other branch extends through contact 3 of relay K12, when K12 is operated, to ground. Under this condition a circuit may be traced from ground through contact 1 of relay K8, contact 2 of relay K6 and contact 1 of relay K14 which connects to the ST 75-speed five-unit conductor, which extends into the multiple sender circuit. The return conductor may be traced through the T 75-speed five-unit lead which continues through contact 3 of relay K14, contact 4 of relay K6 and through resistors R49 and R55 to grid 3 of amplifier 1. For this condition it is required that condenser C18 be connected in parallel with condenser C14. This is performed through the operation of relay K6 which effectively connects these two condensers in parallel.

The operation of relay K6 and release of relay K7 substitutes the potentiometer elements comprising resistor elements K76 and K84 for resistor elements K73 and K86 in the potentiometer circuit of the character timer V7 for 75 rather than 100-speed operation.

This relay combination also substitutes the potentiometer comprising resistor R87 and contact 6 of relay K6 in the delay circuit of triode V3.

*60 speed*

When 60-speed five-unit code signals are to be impressed on amplifier 1, relay K8 is operated and relays K6, K7 and K14 are released. For this condition a circuit may be traced from ground through contact 1 of relay K8, contact 1 of relay K6, contact 1 of relay K7 and contact 5 of relay K14 which connects to the ST 60-speed five-unit conductor which latter conductor extends into the multiple sender. The return path may be traced through the T 60-speed five-unit conductor through contact 10 of relay K14, contact 3 of relay K7, contact 3 of relay K6 and resistors R49 and R55 to grid 3 of amplifier 1. For this condition condenser C17 is connected in parallel with condenser C14 and condenser C18 is disconnected. The circuit for condenser C17 may be traced from ground through condenser C17, contact 5 of relay K7 and contact 6 of relay K6 which is connected in parallel with condenser C14 and through resistor R39 to plate 4 of delay triode V3. Resistors R75 and R85 now serve in the potentiometer circuit of the timer of tube V7 in a path through contact 9 of relay K7 and contact 10 of relay K6.

The potentiometer comprising resistor R89 is connected in the delay circuit of triode V3 through contact 7 of relay K7 and contact 8 of relay K6 for this condition.

*25 percent distortion*

When signals having 25 percent distortion are to be produced, relays K4 and K8 are operated and relay K5 is released. In order to operate relay K4, ground is applied to conductor J in the line concentrating unit test circuit. For this condition a circuit may be traced from battery through resistor R200, resistor R59, contact 5 of relay K8 and conductor N, which extends from Fig. 1 into Fig. 2, resistor R70, contact 3 of relay K5 and contact 1 of relay K4 to condenser C14 and in parallel through resistor R39 to anode 4 of relay triode V3. The magnitude of the charging resistors in this resistor capacitance circuit fixes the amount of distortion at 25 percent.

*30 percent distortion*

When signals having 30 percent distortion are to be produced, relays K5 and K8 are operated and relay K4 is released. Relay K5 is operated from battery through the right-hand winding of relay K5 and conductor K to ground in the line concentrating unit test circuit. Under these conditions a circuit may be traced from battery through resistor R200, resistor R59, contact 5 of relay K8, conductor N from Fig. 1 into Fig. 2, resistor R70, resistor R69, contact 2 of relay K5 and contact 1 of relay K4 to capacitance C14 in parallel with the anode 4 circuit of delay triode V3.

*35 percent distortion*

When signals having 35 percent distortion are to be produced, relays K4, K5 and K8 are all operated. Relays K4 and K5 are operated from battery through the right-hand winding of relay K4 and from battery through the left-hand winding of relay K5 in parallel through conductor M to ground in the line concentrating unit test circuit. With the circuit in this condition a path may be traced from battery through resistor R200, resistor R59, contact 5 of relay K8, conductor N which extends from Fig. 1 into Fig. 2, resistor R70, resistor R69, resistor R68, contact 4 of relay K5 and contact 2 of relay K4 to the parallel branches extending through capacitance C14 and the anode 4 circuit of delay triode V3.

It will be observed that in each of the three foregoing cases, that is for fixed amounts of distortion of 25 percent, 30 percent or 35 percent, the control of the circuit is through the line concentrating unit. That is to say, when the control of the circuit is remote the circuit affords three different fixed amounts of distortion.

*Dial control of distortion*

Instead of introducing 25 percent, 30 percent or 35 percent distortion in the circuit, in the manner described under the previous three headings, the amount of distortion introduced may be varied in discrete smaller steps over a range from zero to 45 percent, for instance, by means of control switches S1 and S2 in Fig. 3. Under these circumstances relays K4 and K5 are released and relay K8 is operated. A circuit may then be traced from battery through resistor R200, resistor R59, contact 5 of relay K8, conductor N, which extends from Fig. 1 into Fig. 2 and Fig. 3 and, through any desired combination of resistances afforded by the settings of the switches, then through conductor R, from Fig. 3 into Fig. 2, through contact 1 of relay K4 to the parallel capacitance and anode 4 circuit of delay triode V3. Switch S1 may be calibrated in 1 percent steps from zero to 4 and switch S2 calibrated in 5 percent steps from zero to 45, for instance.

Switches S1 and S2 in Fig. 3 are arranged as follows:

Switch S1 comprises two units having a common shaft by means of which their rotatable elements, which are in alignment, are actuable simultaneously. Switch S2 is a single unit switch. With the switches in the position shown, resistor R109 alone is in circuit in series between leads N and R. If switch S1 only is now actuated, resistors R126, R127, R128 and R129 may be added in series for each of the four succeeding counter-clockwise steps of unit A of switch S1 to afford 1 percent, 2 percent, 3 percent and 4 percent distortion. If switch S2 is moved clockwise to its succeeding position, switch unit A of switch S1 is disconnected and resistor R110 is inserted in series with section B of switch S1. With section B in the position shown on the drawing, 5 percent distortion is obtained and for each counter-clockwise step 1 percent is added up to 10 percent. Each step of S2 adds 5 percent up to 45 percent. The intervals between the 5 percent settings of S2 are obtainable by adjusting section B of switch S1. Thus the full range zero to 45 percent is covered in 1 percent steps.

Resistor R119, between points 10 and 11 of switch S2, is of relatively large magnitude. It is insertable in the circuit to afford 100 percent distortion for use in calibration to be described hereinafter.

*Six-unit code*

It was explained in the foregoing that signals having five-unit or six-unit character determining impulses may be supplied from the multiple sender circuit to the input grid 3 of amplifier 1. It was also explained that when five-unit signals are to be produced, relay K14 is in the released condition as shown. When relay K14 is operated by applying a ground to conductor 150 in the line concentrating unit test circuit or by operating key S6 the five-unit signals are disconnected and six-unit signals may be supplied through the front contacts of relay K14. There are three different speeds of six-unit signals, namely 53 speed, 66 speed and 86 speed signals. A particular one of these three may be selected and applied to the grid 3 of amplifier 1 of double triode V1 by operating relays K6 and K7 in a manner to afford the desired signal train.

*Output relay circuit*

The output of the present circuit is arranged to apply distortion to different kinds of signals. The output circuit is arranged to produce the different types of signals to which the distortion is applied. This is achieved by adjusting relays K9, K10, K11 and K12 in a manner to be described hereunder. Relay K13 will actually produce the signals to which the distortion is applied under control of these four relays. By adjusting relays K9, K10, K11 and K12, in a manner which will now be described, the different types of signals indicated in the following headings may be produced.

*—48 volt mark, +48 volt space*

Negative 48 volt mark and positive 48 volt space signals may be produced by operating relay K9 while relays K10, K11 and K12 remain released. Relay K9 is operated over a circuit from battery through the right-hand winding of relay K9, contact 7 of relay K12, conductor ON, which extends from Fig. 3 into Fig. 2, and through a control in the line concentrating unit test circuit to ground. Under this condition the output circuit from tube V6 may be traced from the anode of tube V6 through resistor R61, conductor T, which extends from Fig. 2 into Fig. 3, contact 1 of relay K12 and contact 5 of relay K9 to the junction between resistors R98 and R99. The left-hand terminal of resistor R98 is connected to positive battery. A circuit may be traced from positive battery through resistors R98, R99 and the bottom and top windings of relays K13 to ground. As the signals from the output tube V6 are applied to this circuit the armature of relay K13 will be actuated between its marking contact 1 and its spacing contact 2. A circuit may be traced from negative battery through resistor R96, contact 3 of relay K10 and contact 5 of relay K11 to the marking contact 1 of relay K13. Another circuit may be traced from positive battery through resistor R97, contact 1 of relay K10 and contact 3 of relay K11 to spacing contact 2 of relay K13. As the armature of relay K13 is actuated between its contacts 1 and 2, —48 volt battery and +48 volt battery will be applied through its marking contact 1 and spacing contact 2, respectively, of relay K13 and then through its armature, resistor R101, contact 2 of key S7, to the tip of jack J2, and in parallel through resistor R108 to the tip of jack J1.

*+48 volt mark, —48 volt space*

To produce +48 volt mark and —48 volt space signals relays K9 and K11 are operated and relays K10 and K12 are released. Relay K11 is operated over a circuit from battery through its left-hand winding, contact 3 of key S8, which is operated, and contact 1 of jack J2, which contact is closed to ground. The operation of relay K11 closes a circuit from ground through contact 1 of relay K11, contact 7 of relay K12 and the right-hand winding of relay K9 to battery operating relay K9. Under these conditions the output conductor T from output tube V6 extends through contact 1 of relay K12 and contact 5 of relay K9 to the junction between resistors R98 and R99. Relay K13 will be controlled over the circuit heretofore traced from battery through resistors R98, R99 and its bottom and top windings in series to ground. However, the potentials connected to the marking and spacing contacts of relay K13 have now been reversed. The marking contact is connected to +48 volt battery over a circuit from positive battery through resistor R97, contact 1 of relay K10 and contact 4 of relay K11 to marking contact 1 of relay K13. Negative battery is connected to the spacing contact of relay K13 over a circuit which may be traced from negative battery through resistor R96, contact 3 of relay K10 and contact 2 of relay K11 to spacing contact 2 of relay K13.

*—130 volt mark, +130 volt space*

For the production of —130 volt mark and +130 volt space signals, relays K9 and K10 are operated and relays K11 and K12 are released. Relay K10 is operated over a circuit from battery through its right-hand winding, contact 2 of key S8 and contact 1 of jack J1 which is closed to ground. The operation of relay K10 closes a circuit from ground through contact 5 of relay K10, contact 7 of relay K12 and with right-hand winding of relay K9 to battery operating relay K9. The output conductor T of output tube V6 is connected under these conditions through contact 1 of relay K12 and contact 5 of relay K9 to the junction of resistors R98 and R99. Relay K13 will be controlled over the circuit heretofore traced. The potentials applied to marking contact 1 and spacing contact 2 of relay K13 have been changed to apply —130 volt for the marking condition to marking contact 1 of the relay and +130 volt to spacing contact 2 for the spacing condition of the relay. The circuit may be traced from —130 volt battery through resistor R301, contact 4 of relay K10 and contact 5 of relay K11 to marking contact 1 of relay K13. Positive 130 volt battery is connected through resistor R302, contact 2 of relay K10 and contact 3 of relay K11 to spacing contact 2 of relay K13.

*+130 volt mark, —130 volt space*

For the production of +130 volt mark and —130 volt space signals, relays K9, K10 and K11 are operated and relay K12 is released. The output lead T of output tube V6 extends through contact 1 of relay K12 and contact 5 of relay K9 to the junction of resistors R98 and R99. Transmitting relay K13 will be under control of the circuit heretofore traced. Negative 130 volt battery will be connected to marking contact 1 of relay K13 over a circuit which may be traced through resistor R302, contact 2 of relay K10 and contact 4 of relay K11 to marking contact 1 of relay K13. Positive 130 volt spacing battery will be connected through resistor 301, contact 4 of relay K10 and contact 2 of relay K11 to spacing contact 2 of relay K13.

*Steady mark signal*

For the production of a steady mark signal relays K9 and K12 are operated and relays K10 and K11 are released. Relays K9 and K12 are operated over a circuit from battery through their left-hand windings in parallel, contact 1 of Key S7 and contact 3 of J1 or jack J2 which is closed to ground. With the relays in this condition the output conductor T of output tube V6 extends through contact 2 of relay K12 to an open circuit at contact 6 of relay K9 so that the output circuit will be disconnected from the control circuit of output relay K13. Output relay K13 is under control of the same circuit traced formerly and its armature will remain in engagement with its marking contact 1. Negative 48 volt battery will be connected for this condition through resistor R96, contact 3 of relay K10 and contact 5 of relay K11 to marking contact 1 of relay K13, so that a steady —48 volt signal will be transmitted as a steady marking condition.

*Local control of speed and type of distortion*

For local control of speed and type of distortion relays K9, K10 and K11 are released and relay K12 is operated. The circuit for the operation of relay K12 may be traced from battery through the right-hand winding of relay K12 to parallel circuit through contacts 2 of jacks J1 and J2 to ground.

*Calibration*

The circuit shown at the right in Fig. 2, including the jacks CAL A and COM, and the elements interconnecting the jacks and the plate of tube V6, is a calibration circuit for calibrating the distortion timing. It has been explained that the switches S1 and S2 may be set in different positions to cover a range from zero to 45 percent distortion, for instance. When switch 2 is moved into its last clockwise position so that resistor R119 is connected into the condenser-resistance timing circuit, resistor R119 being of relatively large magnitude, it is possible to obtain 100 percent distortion. Under such circumstances single marking elements or single spacing elements in a train of signal elemnts, depending upon the setting of the circuit, would disappear. The circuit may be calibrated by taking advantage of this phenomenon and adjusting each of the potentiometers, individual to the three timing circuits of delay tube V3, so that single elements in the signal trains do in fact disappear for each of the three speeds when switches S1 and S2 are operated to insert their maximum resistance in circuit, including resistor R119. This insures that for a particular predetermined maximum amount of resistance in the capacitance-resistance timing circuit the distortion is in fact 100 percent. All of the resistor elements which may be inserted in circuit through adjustment of switches S1 and S2 or of relays K4 and K5 have been calculated so that they each have the proper relation to the maximum resistance to afford predeterminable discrete percentage values of distortion throughout the desired range and the fixed amounts 25 percent, 30 percent and 35 percent, respectively.

The elements associated with jacks CAL A and COM and the plate circuit of tube V6 essentially constitute an arrangement for indicating that the circuit has been adjusted for 100 percent distortion. As explained, when this occurs, all single marking elements, for instance, in a train are eliminated. This can be observed by means of a voltmeter connected across a capacitance in a capacitance-resistance charging circuit, in which unidirectional current devices permit small current impulses of a particular polarity to flow into a condenser in response to particular transitions in a signal train. As the potentiometer is adjusted, when the single spacing elements, for instance, disappear the number of charging pulses into the capacitance in unit time is sharply reduced and the voltage recorded on the voltmeter also falls sharply. This indicates that the circuit is set for 100 percent distortion at that particular speed. Each potentiometer is adjusted in turn for the different speeds. The selection of the resistors in the switches S1 and S2 and of the resistors associated with relays K4 and K5 then insures that each setting of the switches will afford a predetermined amount of distortion throughout a desired range and the selective operation of the relays will afford the 25 percent, 30 percent and 35 percent distortion specified.

Refer now to Fig. 2. To adjust for 100 percent distortion for each speed, the circuit is first set, in a manner explained in the foregoing, so that trains having marking bias are being produced. Signal pulses due both to mark-to-space and space-to-mark transitions flow through capacitance C12 and resistor R23 to ground. Because of the short time constant of this circuit, one-fifth millisecond, these signals appear as short negative and positive pips across resistor R23. Varistors CR4 and CR5 are so poled that they permit negative pulses only to pass into capacitance C19. Resistor R67 permits leakage to prevent the voltage from accumulating to the full value of the negative voltage. Accordingly, capacitance C19 will accumulate a small voltage which is approximately proportional to the number of negative pulses. As each potentiometer is adjusted in turn and the amount of marking bias increases from say 99 percent to 101 percent, all single spacing elements will completely disappear and the total number of mark-to-space transitions, in the test message sentence applied to the input of amplifier 1, will fall in the output circuit to about one-half the normal number. This will be indicated on a voltmeter which may be connected to jacks CAL A and COM which are connected across the capacitance C19.

Jack CAL B in Fig. 2 and the elements interconnecting it to the junction of resistors R78 and R79 in the plate circuit of the character timer V7 are used in calibrating the character timer circuit. Each of the three potentiometers connectable to the character timer for the three different speeds of operation is adjusted so that the reading of a direct-current voltmeter connected to jack CAL B indicates the same predetermined voltage for each of the different settings.

The potential of the junction of resistors R78 and R79 will be at its higher level while the right triode of character timer V7 is cut off and at its lower level while it is conducting. While a succession of signal trains are being applied to the input of amplifier 1, the right triode of the character timer V7 will be cut off throughout the interval from the beginning of the start pulse until some instant during the following stop pulse and then will be conducting for the interval from this instant until the beginning of the following start pulse. A proper adjustment of the timer for the three different speeds of operation is attained when the duration of this cut off period is the same percentage of the total period of a train for each of the three speeds. This can be determined by applying the potential from a point in the output circuit of the right triode, of timer V7, such as the junction of resistors R78 and R79, to a capacitance such as C20. When each potentiometer is properly adjusted, the percentage of a time interval, say one second, while the two different potentials are applied to capacitance C20, will be the same for each speed of operation. The potential of the capacitance will be the same for the three speeds. This will be indicated by a voltmeter connected to jack CAL B.

In the calibrating arrangement shown in the drawing, a positively poled non-linear resistor CR6 is connected to the right-hand plate of capacitance C20. Transient impulses resulting fom each transition of the right triode of timer V7 will be applied through capacitance C20 to its junction with non-linear resistor CR6. The positive transients will be directed through the non-linear resistor CR6 to ground. Negative transients will be impressed on the direct-current voltage lead of a voltmeter connected to jack CAL B. The duration of these rectified transients is equal to the recovery time allowed to the character time between characters. The voltmeter gives an average reading proportional to the recovery time, so that the character timer can be properly adjusted.

*Steady marking or spacing end distortion*

Refer now to Fig. 13 which shows a minor modification of the circuit per Figs. 1, 2 and 3 which may be incorporated into the circuit so as to provide two more trains of biased signals, namely a first train having steady marking end distortion and a second train having steady spacing end distortion. The trains of signals having steady marking end distortion will be similar to the train shown in the left-hand portion of Fig. 11. In the present case, a succession of such signals would follow one another. The signals having steady spacing end distortion would be similar to the signals shown in the right-hand portion of Fig. 11 and a succession of such signals would be produced.

The modifications necessary to permit the production of either of these two trains requires the addition of two relays indicated as relay A and relay B in Fig. 13. The portion of the circuit per Figs. 1, 2 and 3 to which the modifications are supplied is indicated in dotted lines in Fig. 13. The modifications are indicated in full lines. All remaining portions of the circuit per Figs. 1, 2 and 3 are unchanged. When successive trains of signals, each having marking end distortion, are to be produced, relay A is operated. When successive trains of signals, each having spacing end distortion, are to be produced, relay B is operated.

The details of the operation of the circuit are as follows:

It is assumed that relay K2 in Fig. 2 is operated. Relay K2 connects the MD and SD leads to the right and left plates respectively of tube V8. When lead MD is positive, as explained heretofore, mark-to-space transitions are delayed and when lead SD is positive space-to-mark transitions are delayed. Relay K3 is assumed to be released as shown in Fig. 13 so that synchronization of the character timing tube V7 is obtained from the output switch V5 in Fig. 2. For marking end distortion, the control lead to the left grid of tube V8 is removed from the right plate of tube V8 and connected to the right plate of the character timer by the operation of the right-hand armature of relay A. Since as explained in the foregoing, the right plate of tube V7 is negative during the stop interval and positive during the transmission of the character forming elements, lead SD will be switched to positive sometime during each output stop interval so that the subsequent mark-to-space start transition will not be delayed. After the start transition has been transmitted by the output circuit, lead MD is switched to positive so that all remaining mark-to-space transitions of the code character are delayed. This produces marking end distortion and trains of signals so distorted will follow successively until the condition of the circuit is changed.

Trains of signals each having spacing end distortion are generated in an identical way except that the control of the right-hand grid of tube V8 is transferred to the right plate of the character timer. As a result of this, lead MD is switched to positive during the stop element of the output signal so that the subsequent start transition will be delayed. After the start transition has been generated in the output circuit, lead SD will be switched to positive which causes all subsequent space-to-mark transitions of that particular character to be delayed. Trains of signals each having spacing end distortions are, therefore, generated and follow each other successively.

When marking end distortion is being generated the character timer voltage must also be connected to tube V4 to prevent a "hole" which would otherwise be produced in the stop element as explained in the description of the output switch in the foregoing. The connection is shown in Fig. 13.

What is claimed is:

1. In a telegraph signal distortion producing device, a source of multielement, start-stop, permutation code telegraph signal trains of standard duration, a first means for inverting said signals, a second means for reinverting said signals, a distortion delay timing circuit, a gate intermediate said timing circuit and said first and said second means, said gate comprising a first and a second space discharge device connected to said first and said second means respectively, a signal train timer, a signal train counter responsive to said timer and means for selectively impressing controlling potentials produced by said counter on said first and said second device so as to pass said inverted signals through said first device at a first time and to pass said reinverted signals through said second device at a second time.

2. In a telegraph signal distortion generating device, a source of signal trains of standard duration, a space discharge delay circuit connected to said source to distort said signal trains, a space discharge timing circuit having a capacitor-resistor control, said control responsive to the start transition in a signal train, said timing circuit connected to said delay circuit, to control the passage of signals therethrough for measured intervals.

3. A telegraph signal distortion generating device comprising a source of multielement permutation code signal trains having signal elements of standard duration connected to a delay circuit, said delay circuit including means for varying the delay imparted to signal elements in said trains, said means comprising a first adjustable resistor-capacitor timing circuit connected to the output of a space discharge device, a second resistor-capacitor timing circuit and a space discharge device responsive thereto, for timing a signal train, a multivibrator counting circuit, responsive to said second timing circuit and a potential control means interconnecting said counting circuit and said delay circuit for switching the condition of said delay circuit at predetermined intervals during the transmission of successive signal trains.

4. A telegraph signal distortion generating device comprising a source of successive multielement permutation code signal trains of standard duration for differing speeds of transmission, space discharge distortion producing means connected to said source, a variable distortion delay timing circuit connected to said means, said circuit having a plurality of resistor and capacitor elements, a switching circuit for varying the number of said resistors and capacitors effectively connected in said timing circuit, for applying predetermined percentages of distortion to the signal elements of said trains at said differing speeds.

5. A telegraph signal distortion generating device including sources of signal trains of standard duration at differing speeds of transmission connected to a space discharge delay circuit, said delay circuit including means for imparting predetermined percentages of distortion to the signal elements of said trains, a multivibrator, a timer connected to said multivibrator, means in said timer for measuring a plurality of intervals corresponding to the duration of the differing trains produced by said source and a switch in said delay circuit controlled by said multivibrator, for switching the signal transitions to which distortion is imparted in said trains.

6. A telegraph signal distortion generator comprising a space discharge delay circuit including means for selectively delaying space-to-mark or mark-to-space transitions, a space discharge timing control for said delay circuit, a thermionic switch responsive to said control for switching said delay circuit and means in said delay circuit responsive to said switching for producing signals having delay imparted to a predetermined transition.

7. A telegraph signal distortion generating circuit, said circuit comprising means for delaying space-to-mark signal transitions, means for delaying mark-to-space signal transitions, switching means for transferring from one to another of said delay means, said switching means comprising space discharge signal inversion circuits connected to potential controlled electronic gates, and means for synchronizing said delay means with the signal frame, so as to produce signal distortions of a desired sort, said synchronizing means comprising a space discharge timing circuit having means for measuring predetermined intervals corresponding to signal frames and means for varying said potential applied to said gates at the termination of said intervals.

8. A telegraph signal distortion generating circuit, said circuit comprising means for generating a first train of start-stop signal elements having marking bias, means for generating a second train of start-stop signal elements having spacing bias, means for switching said circuit during the stop pulse between successive trains so that said first train and said second train alternate successively, said switching means comprising an electronic timer responsive to the stop pulse in each train, a multivibrator responsive to said timer and electronic gates responsive to potential changes of said multivibrator.

9. A telegraph signal distortion generating circuit, said circuit comprising means for generating a first train of start-stop signal elements having marking end distortion, means for generating a second train of start-stop signals having spacing end distortion and means for switching said circuit during the start pulse of each train, so that said first train and said second train alternate successively, said switching means comprising an electronic timer responsive to the start pulse in each train, a multivibrator responsive to said timer and electronic gates responsive to potential changes of said multivibrator.

10. A telegraph signal distortion generating circuit, said circuit comprising means for generating a first train of start-stop signals having marking bias, means for generating a second train of start-stop signals having marking end distortion, means for generating a third train of start-stop signal elements having spacing bias, means for generating a fourth train of start-stop signals having spacing end distortion, means for switching said circuit during alternate start pulses, so that said first, second, third and fourth trains are generated in numerical sequence, said switching means comprising an electronic timer responsive to start pulses of said trains, a multivibrator counter responsive to said timer and electronic gates responsive to potential changes of said multivibrator during alternate start pulses.

11. A calibration circuit for a telegraph signal distortion generator, said generator having means therein for applying distortion selectively to mark-to-space or space-to-mark transitions in signal trains, means for applying changing amounts of distortion, through a critical value of 100 percent of distortion, to the selected transitions, and means, dependent upon the elimination of single signal elements to which said 100 percent distortion is applied, for determining when said critical value is applied.

12. A calibration circuit for a telegraph signal distortion generator, said circuit having means therein for establishing a 100 percent signal distortion point as a standard of reference, said generator having means therein for applying distortion selectively to one type of a plurality of types of telegraph signal elements, means in said calibration circuit for progressively changing the magnitude of said distortion applied to said one type until signals of said one type are eliminated and means in said calibration circuit responsive to the elimination of signals of said one type for indicating that signals of said one type have been eliminated, to establish said 100 percent point.

13. A calibration circuit for a telegraph signal distortion generator, said circuit comprising means for progressively applying distortion to signal transitions of a particular type, in trains of signal elements, to the critical point of elimination of transitions in single signal elements of the selected type, said circuit comprising means for selecting the other elements of said type to which said distortion has been applied, means for storing increments of electrical energy proportional to the number of other elements of the selected type in said trains to which said distortion has been applied and means for indicating said critical point, said means comprising means for measuring an abnormal change in said stored increments at said critical point.

14. A calibration circuit for calibrating a timing device, means connected to said timing device for impressing two electrical conditions, on said device, in a predetermined time relationship for the two conditions, means connected to said timing device for generating a transient electrical potential wave in response to the impressing on said device of one of said conditions, a potential polarity discriminating device connected to said transient generating device for selecting potential of a predetermined polarity in said transient during the interval while one of said conditions and said transient persist, and means for measuring the interval during which said potential of said predetermined polarity is selected.

15. A calibration circuit for a space discharge timer comprising a timer, a transient potential wave generator connected to said timer, a condenser connected to said generator for passing a transient wave produced by said generator, a rectifier connected to the output of said condenser for shunting a portion of said wave, said portion of a particular polarity and a meter connected to said condenser responsive to that portion of said wave of a polarity opposite from said shunted polarity.

16. A telegraph signal distortion generating circuit, said circuit comprising a first sub-circuit, said sub-circuit having means therein for selectively imparting distortion to marking or spacing signal elements in a standard multielement signal train, a source of standard multielement signal trains connectable to said sub-circuit, said sub-circuit comprising a space discharge input gate, said source connected to said gate through individual paths for normal and inverted signal trains, a second sub-circuit in said generating circuit, said second circuit comprising a capacitor-resistor controlled space discharge signal train timer and a multivibrator signal train counter, responsive to said timer, means interconnecting said timer, and said input gate for selectively passing said normal signal trains or said inverted signal trains through said input gate, and a capacitor-resistor controlled space discharge distortion delay circuit connected to the output of said gate.

17. A telegraph signal distortion generating circuit comprising a source of standard multielement signal trains, said signal elements being substantially rectangular, a space discharge input gate in said circuit, said source connected to said gate through a first and second channel, space discharge means in said first channel for passing normal signal trains to said gate, space discharge means in said second channel for passing inverted signal trains to said gate, a capacitor-resistor controlled space discharge timer in said circuit for timing said signal trains, a multivibrator counter responsive to said timer for counting said signal trains, means interconnecting said counter and said gate for selectively passing normal signal trains or inverted signal trains through said gate at a particular time, a common output circuit connected to said gate, a capacitor-resistor controlled space discharge distortion delay timing circuit connected to said output circuit, said delay timing circuit having means for selectively imparting delay to signal elements having transitions of the same single polarity in both of said trains, and space discharge means responsive to said delay for producing substantially rectangular signal elements of non-standard duration having predetermined amounts of distortion incident to said delay.

18. A telegraph signal distortion generating circuit in accordance with the last preceding claim, and means connected to said counting circuit for controlling said input gate so as to alternately pass one of said normal and one of said inverted trains.

19. A telegraph signal distortion generating circuit in accordance with the penultimate claim, said circuit including counting means for controlling said input gate so as to alternately pass a plurality of said normal signal trains, and a corresponding plurality of said inverted signal trains.

20. A telegraph signal distortion generating circuit in accordance with claim 17, an output switch in said first sub-circuit, a circuit interconnecting said output switch and said timer, and means in said circuit responsive to said output switch for starting a timing cycle for a signal train at a predetermined point in a signal train.

21. A telegraph signal distortion generating circuit in accordance with claim 17, a first means in said generating circuit, responsive to a condition imposed on the input of said generating circuit, for starting said timer to time the duration of a distorted signal train at the normal start position of a train, and second means in said generating circuit responsive to a delayed signal element in the output of said generating circuit for starting said timer to time the duration of a signal train after an interval equal to the delay imparted to a signal element by said generating circuit.

22. A telegraph signal distortion generating circuit in accordance with claim 17, said circuit comprising a first means for opening said input gate to pass a signal train at the normal starting point of a signal train, said circuit comprising also a second means for opening said input gate to pass a signal train after an interval equal to the delay imparted by said distortion circuit.

References Cited in the file of this patent

UNITED STATES PATENTS

| | | |
|---|---|---|
| 1,900,992 | McCann | Mar. 14, 1933 |
| 2,036,059 | Lang | Mar. 31, 1936 |
| 2,140,680 | Rhodes | Dec. 20, 1938 |
| 2,183,613 | Hanke, et al. | Dec. 19, 1939 |
| 2,303,054 | Lang | Nov. 24, 1942 |
| 2,313,906 | Wendt | Mar. 16, 1943 |
| 2,419,340 | Easton | Apr. 22, 1947 |
| 2,426,225 | Krause | Aug. 26, 1947 |
| 2,446,244 | Richmond | Aug. 3, 1948 |
| 2,519,802 | Wallman | Aug. 22, 1950 |
| 2,531,600 | Barney, et al. | Nov. 28, 1950 |